United States Patent [19]

Trübenbach et al.

[11] Patent Number: 5,935,898
[45] Date of Patent: *Aug. 10, 1999

[54] MONOMODAL AND POLYMODAL CATALYST SUPPORTS AND CATALYSTS HAVING NARROW PORE SIZE DISTRIBUTIONS AND THEIR PRODUCTION

[75] Inventors: Peter Trübenbach; Alfred Hagemeyer, both of Ludwigshafen; Günter Lauth, Ratzenburg; Uwe Dingerdissen, Seeheim-Jugenheim; Franz Josef Bröcker, Ludwigshafen; Klemens Flick, Herxheim, all of Germany

[73] Assignee: BASF Aktiengesellschaft, Ludwigshafen, Germany

[ * ] Notice: This patent is subject to a terminal disclaimer.

[21] Appl. No.: 08/711,989

[22] Filed: Sep. 10, 1996

[30] Foreign Application Priority Data

Sep. 12, 1995 [DE] Germany ............... 195 33 486

[51] Int. Cl.⁶ ........................... B01J 23/00
[52] U.S. Cl. ............... 502/527.14; 502/300; 502/150; 502/174; 502/173; 502/232; 502/63; 502/177; 502/200; 502/159; 502/162; 502/167; 502/168; 502/201; 502/208; 502/217; 502/344; 502/352; 502/325; 502/326; 502/339; 502/345; 502/349; 502/355; 502/303; 502/319; 502/350
[58] Field of Search ................ 502/300, 150, 502/174, 173, 232, 63, 177, 200, 159, 162, 167, 168, 201, 208, 217, 344, 352, 325, 326, 339, 345, 349, 355, 303, 319, 350, 527.14

[56] References Cited

U.S. PATENT DOCUMENTS

| | | | |
|---|---|---|---|
| 3,755,204 | 8/1973 | Sergeya ..................... | 252/455 R |
| 4,314,913 | 2/1982 | Derrien et al. ................. | 252/464 |
| 4,352,923 | 10/1982 | Kono et al. ..................... | 528/233 |
| 4,356,113 | 10/1982 | Lim et al. ..................... | 252/455 Z |
| 4,536,358 | 8/1985 | Welsh et al. ................... | 264/81 |
| 5,145,900 | 9/1992 | Sterzel et al. ................. | 524/404 |
| 5,191,144 | 3/1993 | Le et al. ..................... | 585/643 |
| 5,198,489 | 3/1993 | Sterzel et al. ................. | 524/439 |
| 5,217,930 | 6/1993 | Dubots ......................... | 501/88 |
| 5,304,364 | 4/1994 | Costa et al. ................... | 423/338 |
| 5,342,561 | 8/1994 | Sterzel et al. ................. | 264/49 |
| 5,384,290 | 1/1995 | Brenzy ........................ | 501/81 |
| 5,395,808 | 3/1995 | Miller et al. .................. | 502/7 |
| 5,460,759 | 10/1995 | Dubots ......................... | 264/29.7 |
| 5,612,009 | 3/1997 | Fetzer et al. ................... | 423/239.1 |

FOREIGN PATENT DOCUMENTS

| | | |
|---|---|---|
| 0413231 | 2/1991 | European Pat. Off. . |
| 0513500 | 11/1992 | European Pat. Off. . |
| 4120687 | 1/1993 | Germany . |
| 1458961 | 12/1976 | United Kingdom . |

OTHER PUBLICATIONS

Despeyroux et al., "Auf den Trager kommt es an", Chem. Ind.. vol. 10, 1993, pp. 48–49 no month (no translation).

Hammon et al., "Fabrication of pellets with defined pore–-size distribution", Chem. Ing. Tech., vol. 56 (1984), pp. 455–466 no month (English abstract only, see p. 455).

Primary Examiner—Virginia Manoharan
Assistant Examiner—Nadine Preisch
Attorney, Agent, or Firm—John H. Shurtleff

[57] ABSTRACT

Monomodal or polymodal catalyst supports or catalysts having a BET specific surface area of from 0.01 to 250 m²/g and a monomodal or polymodal pore size distribution having a mean pore diameter of from 50 to 300,000 nm measured by the mercury pressure porosimetry method, wherein a) from 10 to 95% of the pore volume is at from 0.1 to 3 times the mean pore diameter and/or b) from 10 to 80% of the pore volume is at from 0.4 to 3 times the mean pore diameter and/or c) from 50 to 95% of the pore volume is at from 0.1 to 1 times the mean pore diameter and/or d) from 50 to 80% of the pore volume is at from 0.4 to 1 times the mean pore diameter and e) the width at half height of the pore size distribution is less than 0.5 times the mean pore diameter, which are useful for preparing chlorine from hydrogen chloride in a non-steady-state Deacon process, for the reaction of ethylbenzene to give styrene in a non-steady-state oxydehydrogenation, for preparing aziridine from ethanolamine, in reductions, hydrogenations, oxidations, dehydrogenations, acid- or base-catalyzed reactions or reactions in a fluidized bed, for removing combustion residues from diesel exhaust gases and for removing $NO_x$ from waste gases, in bioreactors together with bacteria and as biocatalyst supports with immobilized enzymes or microbes, and a process for producing said monomodal or polymodal catalyst supports or catalysts.

10 Claims, 14 Drawing Sheets

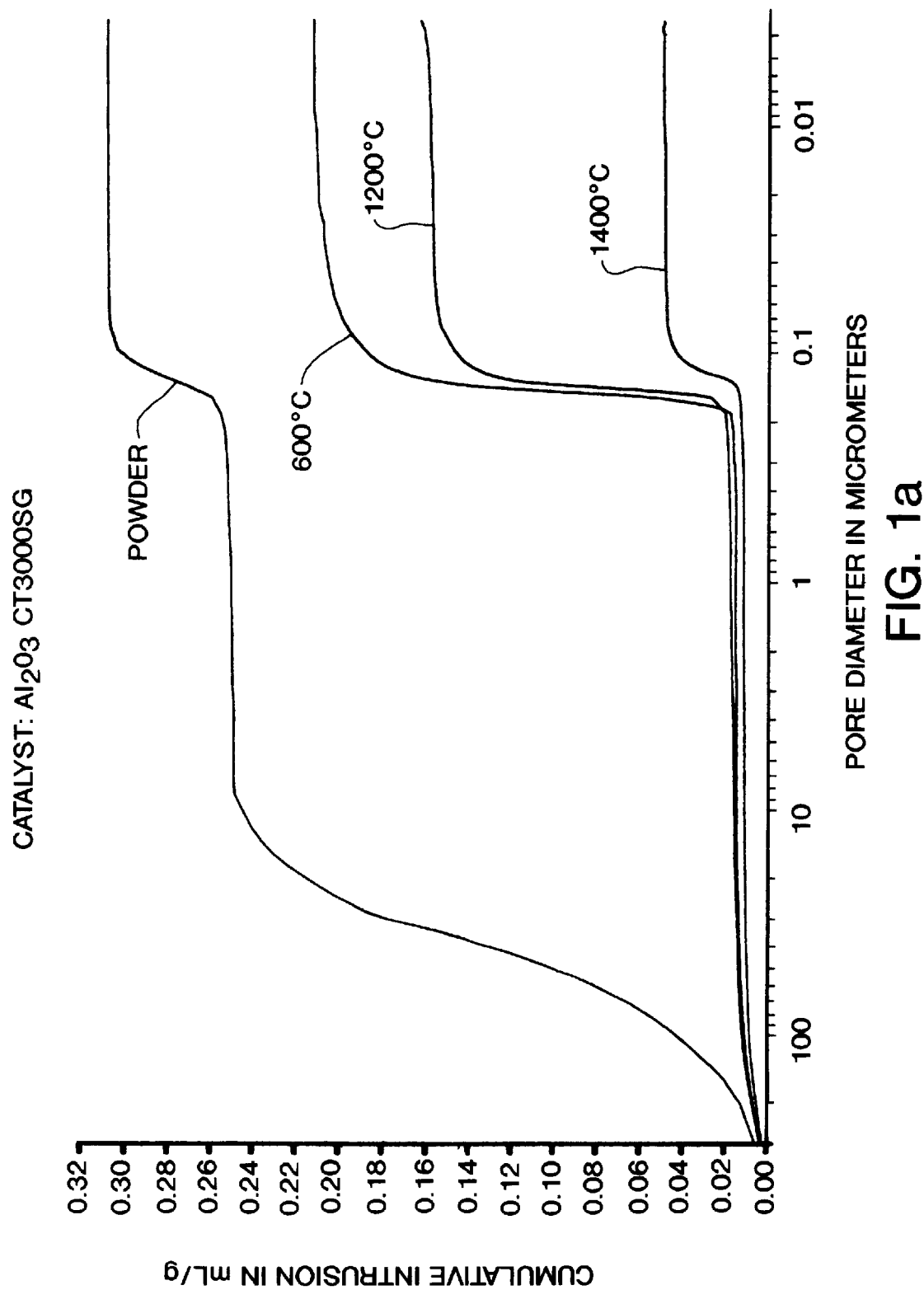

MONOMODAL AND POLYMODAL CATALYST SUPPORTS AND CATALYSTS HAVING NARROW PORE SIZE DISTRIBUTIONS AND THEIR PRODUCTION

The present invention relates to catalyst supports and catalysts having a narrow pore size distribution, a process for their production and their uses.

U.S. Pat. No. 5,191,144 discloses zeolites having a very uniform pore size from 0.2 to 1 nm which can be varied in the micropore range (<2 nm), produced by hydrothermal synthesis. Owing to the low pore size, the size of molecules which can be reacted is restricted. Since an $SiO_2$ binder is used in zeolites, these zeolites are stable only to 700° C. and not chemical-resistant above 400° C., and their mechanical stability is poor. In addition, the zeolites have very acid surfaces, which limits their use to acid-catalyzed reactions.

Chem. Ind., 10 (1993) 48–49 discloses a process for producing catalyst supports in the mesopore range (from 2 to 50 nm) from pyrogenic oxides ($SiO_2$, $Al_2O_3$, $TiO_2$, $ZrO_2$) by reacting the halides in an oxyhydrogen flame. The pore sizes of the supports are from 10 to 70 nm, with no pores being formed in the range less 8 nm. However, the pore distributions are broad.

Chem. Ing. Tech., 56 (1984) 455–463 discloses melamine as macropore former. However, pyrolysis leads to crack formation.

U.S. Pat. No. 3,755,204 discloses porous ceramic bodies produced by shaping a mixture of ceramic powder, a polyolefin (polyethylene copolymer) and a plasticizer (mineral oil, diethylene glycol, polyvinyl alcohol, polyvinylpyrrolidone), pyrolysis and sintering. The cracks occurring in the ceramic body during pyrolysis can be avoided by extraction of the plasticizer with aqueous surfactant solutions (DE-A-24 59 475). These are ceramic honeycomb bodies in which the open pores are introduced as channel structures by the thermoplastic shaping.

DE-A-24 59 475 discloses a process for producing shaped porous metal structures in which a mixture of metal powder, polyolefin and a plasticizer is compounded and the plasticizer is leached from the mixture using a solvent prior to pyrolysis.

DE-A-41 20 687 discloses porous sintered parts of metal or ceramic, produced using a polyolefin, a plasticizer and an additive which is not miscible with the binder system. The additive is a vinylaromatic copolymer based on polystyrene which is introduced at a particle size of from 20 to 250 µm as a spacer between the metal or ceramic particles. Variation of the additive particle size enables different but unspecified pore sizes to be produced. The pore size distribution is bimodal and broad, since the pores are formed, on the one hand, by the particle size distribution of the additive and on the other hand by the interstitial spaces between the metal or ceramic particles.

EP-A-446 708 discloses the production of dense metallic shaped parts and EP-A-444 475 discloses the production of dense ceramic shaped bodies via the shaping of thermoplastic compositions.

EP-A-413 231 discloses a process for producing dense inorganic sintered shaped parts, in which green bodies of sinterable powders and polyoxymethylene or a copolymer containing a predominant proportion of oxymethylene units as binder are shaped by extrusion or injection molding. The binder is removed quickly, without cracking and without distortion from these green parts by treatment with a gaseous acid or boron trifluoride. The binder-free porous parts have a low mechanical stability and are sintered to fall density. This route is used to produce dense, ceramic or metallic structural materials or functional materials having a complicated shape, which are not suitable as catalyst supports or catalysts.

Sinterable organic polymers such as Teflon (EP-A-513500), polyimide or unplasticizable polymers (EP-A-517025) can also be processed into dense components using this production method.

It is known from DE-A-41 20 647 that it is very difficult to reproducibly produce mechanically stable parts having a constant pore distribution from very fine metal or ceramic powders particle size about 1 µm) using the known processes.

It is an object of the present invention to provide a solution to the above-mentioned drawbacks.

We have found that this object is achieved by novel and improved monomodal or polymodal catalyst supports or catalysts having a BET specific surface area of from 0.01 to 250 $m^2/g$ and a monomodal or polymodal pore size distribution having a mean pore diameter of from 50 to 300,000 nm measured by the mercury pressure porosimetry method, wherein a) from 10 to 95% of the pore volume is at from 0.1 to 3 times the mean pore diameter and/or b) from 10 to 80% of the pore volume is at from 0.4 to 3 times the mean pore diameter and/or c) from 50 to 95% of the pore volume is at from 0.1 to 1 times the mean pore diameter and/or d) from 50 to 80% of the pore volume is at from 0.4 to 1 times the mean pore diameter and e) the width at half height of the pore size distribution is less than 0.5 times the mean pore diameter, and also a process for their production by shaping a mixture of A) from 15 to 70% by volume of I) an inorganic powder selected from the group of oxides, nitrides, carbides, silicates, aluminosilicates of the elements beryllium, magnesium, calcium, strontium, barium, boron, aluminum, gallium, indium, thallium, silicon, germanium, tin, lead, antimony, selenium, tellurium, polonium, astatine, iron, cobalt, nickel, ruthenium, rhodium, palladium, osmium, iridium, platinum, copper, silver, gold, zinc, cadmium, mercury, scandium, yttrium, lanthanum, actinium, titanium, zirconium, hafnium, vanadinium, niobium, tantalum, chromium, molybdenum, tungsten, manganese, technetium, rhenium, cerium, praseodymium or mixtures thereof and/or II) a metallic powder selected from among metals and alloys of the elements boron, aluminum, gallium, indium, thallium, silicon, germanium, tin, lead, antimony, selenium, tellurium, polonium, neodymium, samarium, dysprosium, astatine, iron, cobalt, Raney cobalt, nickel, Raney nickel, ruthenium, rhodium, palladium, osmium, iridium, platinum, copper, silver, gold, zinc, cadmium, mercury, scandium, yttrium, lanthanum, actinium, titanium, zirconium, haflium, vanadinium, niobium, tantalum, chromium, molybdenum, tungsten, manganese, technetium, rhenium, cerium, praseodymium, WC, TiC, TaC, VC or mixtures thereof, WC-cobalt, TiC-cobalt, TaC-cobalt, VC-cobalt or mixtures thereof and also carbon and/or III) an active component selected from the group of the inorganic acids, the metals selected from among lithium, sodium, potassium, rubidium, cesium, francium, beryllium, magnesium, calcium, strontium, barium, boron, aluminum, gallium, indium, thallium, silicon, germanium, tin, lead, arsenic, antimony, bismuth, selenium, tellurium, polonium, astatine, iron, cobalt, Raney cobalt, nickel, Raney nickel, ruthenium, rhodium, palladium, osmium, iridium, platinum, copper, silver, gold, zinc, cadmium, mercury, scandium, yttrium, lanthanum, actinium, titanium, zirconium, hafnium, vanadinium, niobium, tantalum, chromium, molybdenum, tungsten, manganese, technetium, rhenium, cerium, praseodymium, mixtures thereof, or their borates, carbonates, silicates, nitrates, phosphates, arsenates, antimonates, bismutates, sulfates, selenates, tellurates, vanadates, molybdates, niobates, chromates, oxides, hydroxides, halides, sulfides, selenides, tellurides, nitriden, phosphides, arsenides, acetates, acetylacetonates, palladates, platinates, cyanides, thiocyanates, manganates, rhenates, osmates, carbides, silicides, borides, their ammonium compounds or their mixtures and/or IV) an organic powder selected from the group teflon or polyimide B) from 30 to 85% by volume of a mixture of $B_1$) from 50 to 100% by weight of a polyoxymethylene homopolymer or copolymer and $B_2$) from 0 to 50% by weight of a polymer homogeneously dissolved in B1) or dispersed in B1) at a mean particle size of less than 1 μm and C) from 0 to 15% by volume of a dispersant, removing the binder by treatment with a gaseous acid at from 100 to 160° C., residue pyrolysis at from 400 to 600° C. and subsequent presintering at from 600 to 1400° C. and, if desired, applying active components III to the component A) or to the presintered composition by single or multiple steeping, impregnation, spray impregnation, precipitating on, hicoating, washcoating or spray drying, wherein the catalyst supports or catalysts after the pyrolytic removal of the binder have a BET specific surface area of from 0.01 to 250 m$^2$/g and a pore size distribution of from 50 to 300,000 nm measured by the mercury pressure porosimetry method, and also their use for preparing chlorine from hydrogen chloride in a non-steady-state Deacon process, for the reaction of ethylbenzene to give styrene in a non-steady-state oxydehydrogenation, for preparing aziridine from ethanolamine, for the reaction of trimethylcyclohexenone to give trimethylphenol, in reductions, hydrogenations, oxidations, dehydrogenations, acid- or base-catalyzed reactions or reactions in a fluidized bed, for removing combustion residues from diesel exhaust gases and for removing NO$_x$ from waste gases, in bioreactors together with bacteria and as biocatalyst supports with immobilized enzymes or microbes.

The catalyst supports or catalysts of the present invention are preferably not zeolitic and have a BET specific surface area of from 0.01 to 250 m$^2$/g, preferably from 0.1 to 200 m$^2$/g, particularly preferably from 0.5 to 120 m$^2$/g, and a monomodal or a polymodal, ie. a bimodal, trimodal, tetramodal or higher-modal, preferably a bimodal, trimodal or tetramodal, particularly preferably a bimodal or trimodal, pore size distribution having a mean pore diameter of from 50 to 300,000 nm, preferably from 100 to 50,000 nm, particularly preferably from 150 to 25,000 nm, measured using the mercury pressure porosimetry method and a) from 10 to 95%, preferably from 30 to 95%, particularly preferably from 50 to 95%, of the pore volume is at from 0.1 to 3 times the mean pore diameter and/or b) from 10 to 80%, preferably from 30 to 80%, particularly preferably from 50 to 80%, of the pore volume is at from 0.4 to 3 times the mean pore diameter and/or c) from 50 to 95%, preferably from 70 to 95%, particularly preferably from 80 to 95%, of the pore volume is at from 0.1 to 1 times the mean pore diameter and/or d) from 50 to 80%, preferably from 60 to 80%, particularly preferably from 65 to 80%, of the pore volume is at from 0.4 to 1 times the mean pore diameter and e) the width at half height of the pore size distribution is less than 0.5 times, ie. from 0.001 to 0.49 times, preferably from 0.005 to 0.4 times, particularly preferably from 0.1 to 0.3 times, the mean pore diameter.

Among the catalyst supports or catalysts of the present invention, preference is given to those in which the conditions a) and b) or a) and c) or a) and d) or b) and c) or b) and d) or c) and d) are simultaneously met, particular preference is given to those in which the conditions a), b) and c) or a), b) and d) or a), c) and d) or a), c) and d) or b), c) and d) are simultaneously met, particularly preferably those catalyst supports or catalysts in which all four conditions a), b), c) and d) are simultaneously met.

BRIEF DESCRIPTION OF DRAWINGS

FIGS. 1a, 1b and 2–13 represent plots of the incremental intrusion vs. diameter for the composition samples defined in Table II of this specification.

Figure 1B:
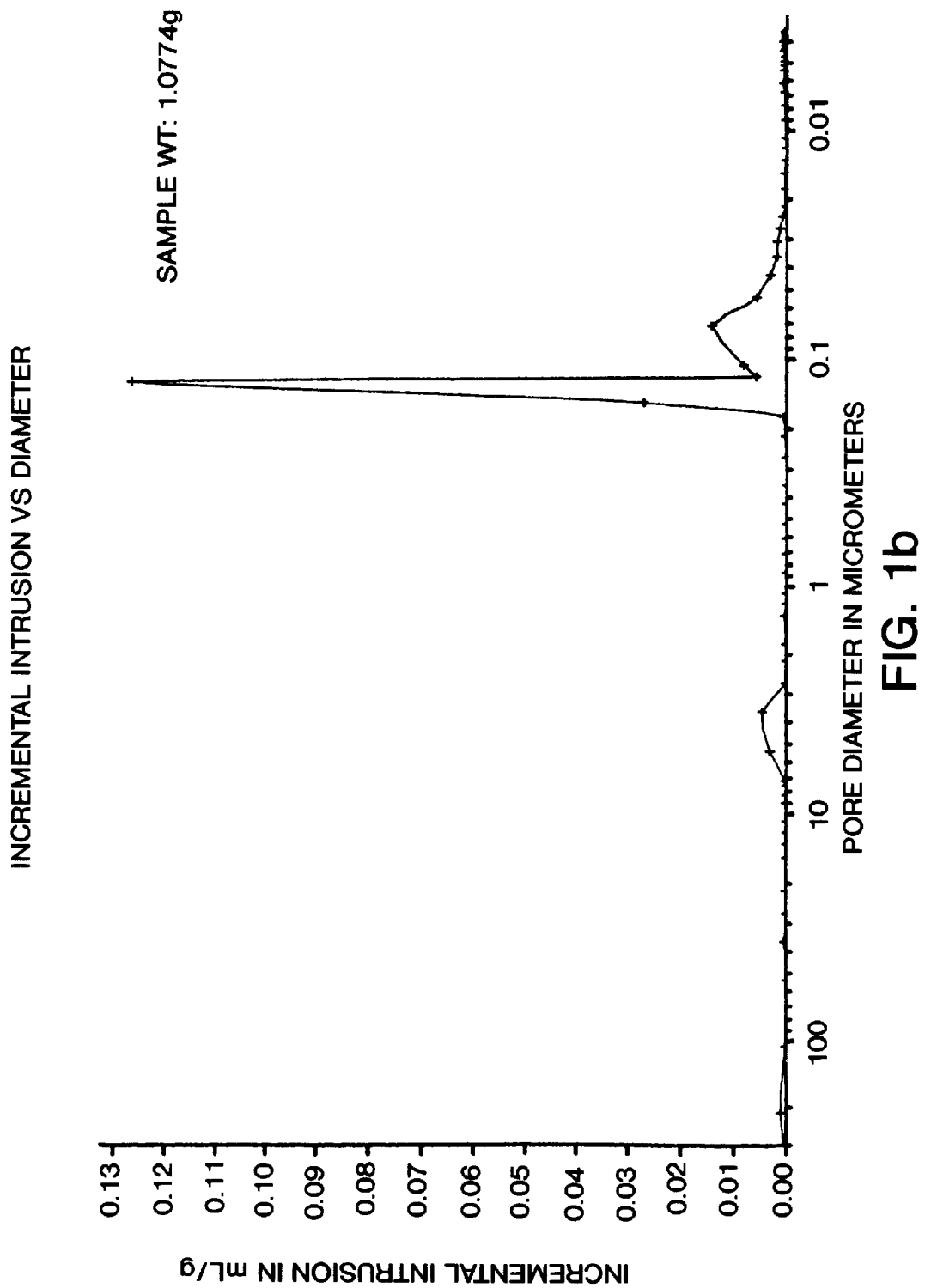
Figure 2:
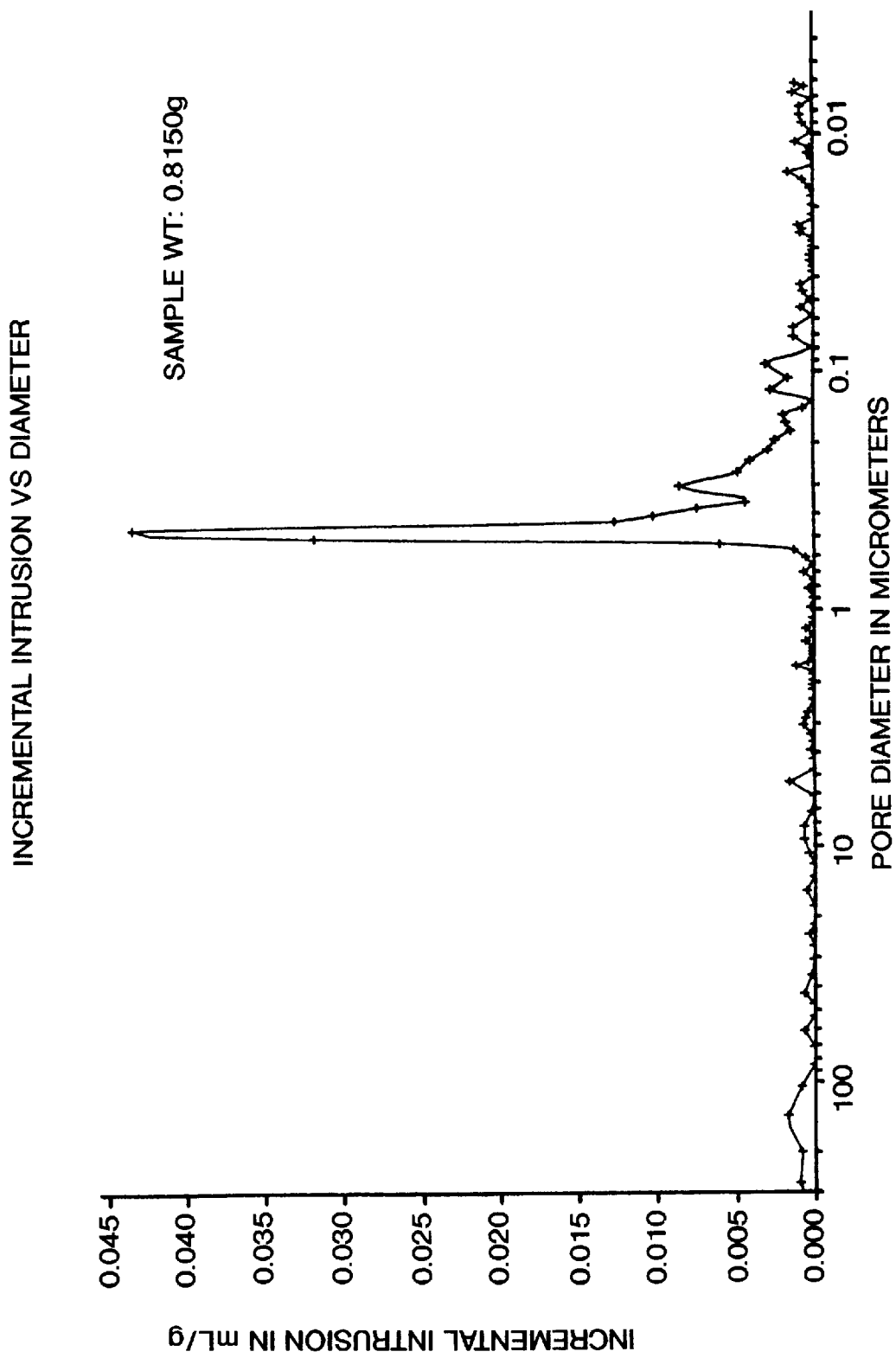
Figure 3:
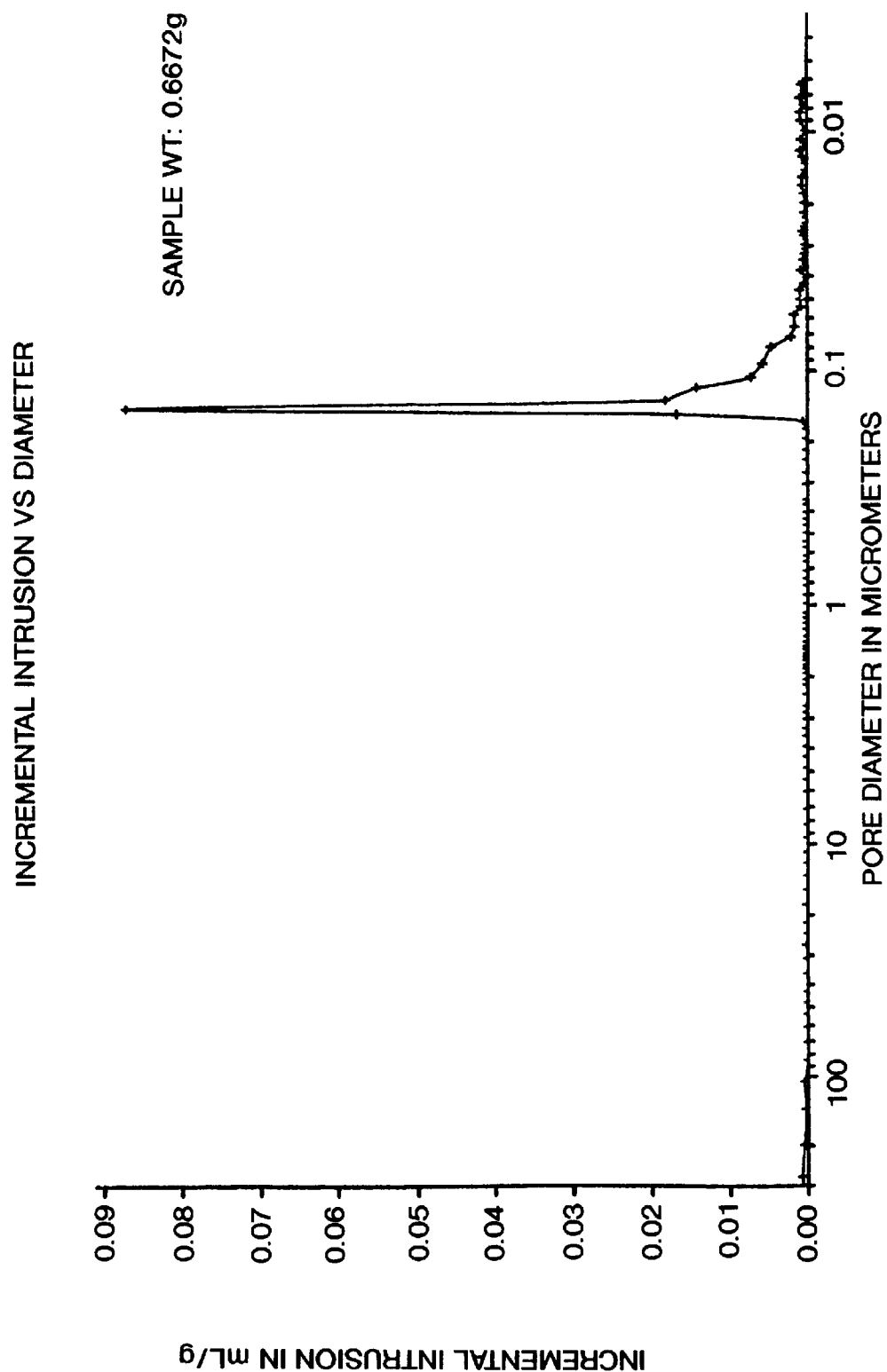
Figure 4:
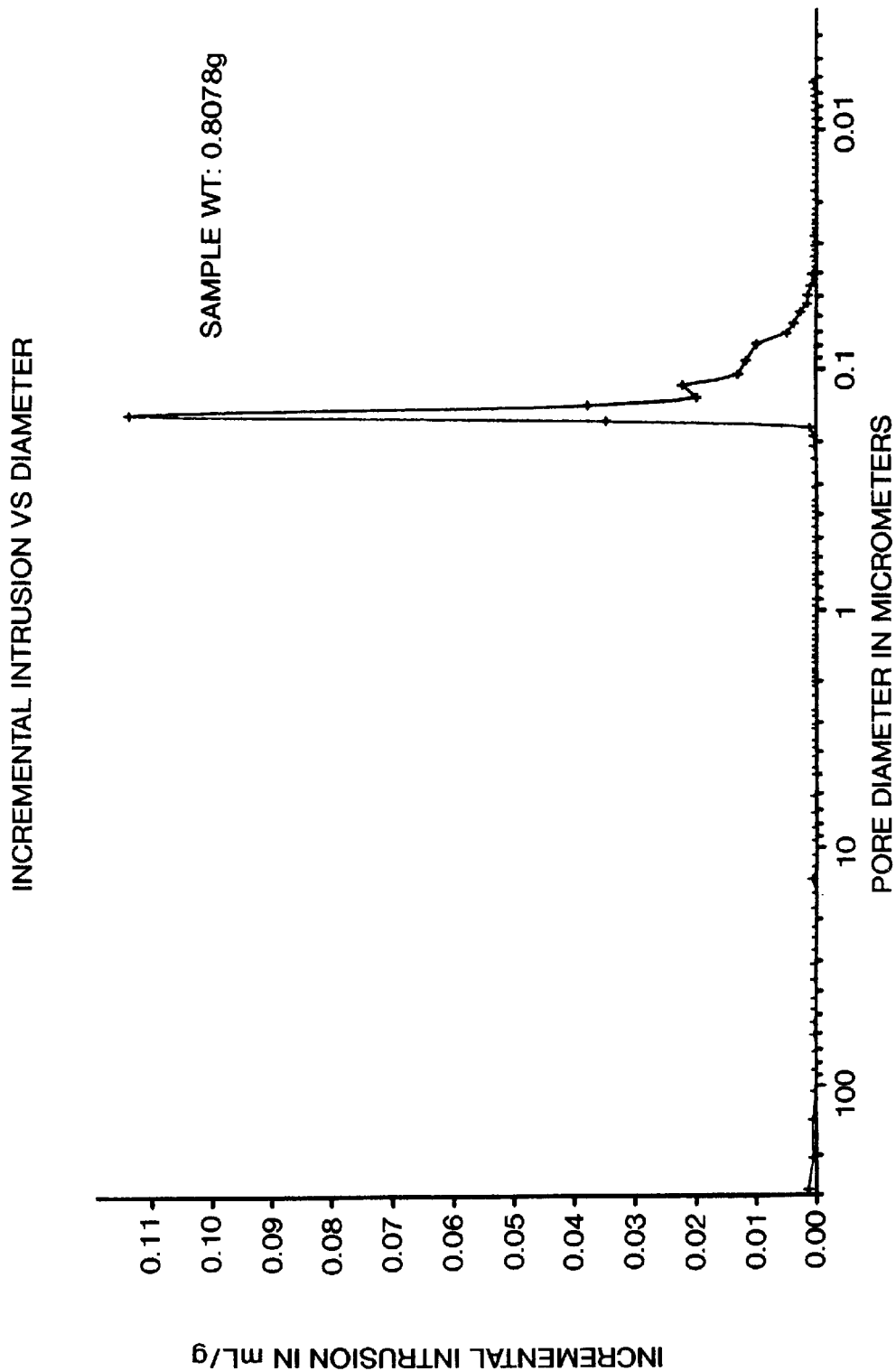
Figure 5:
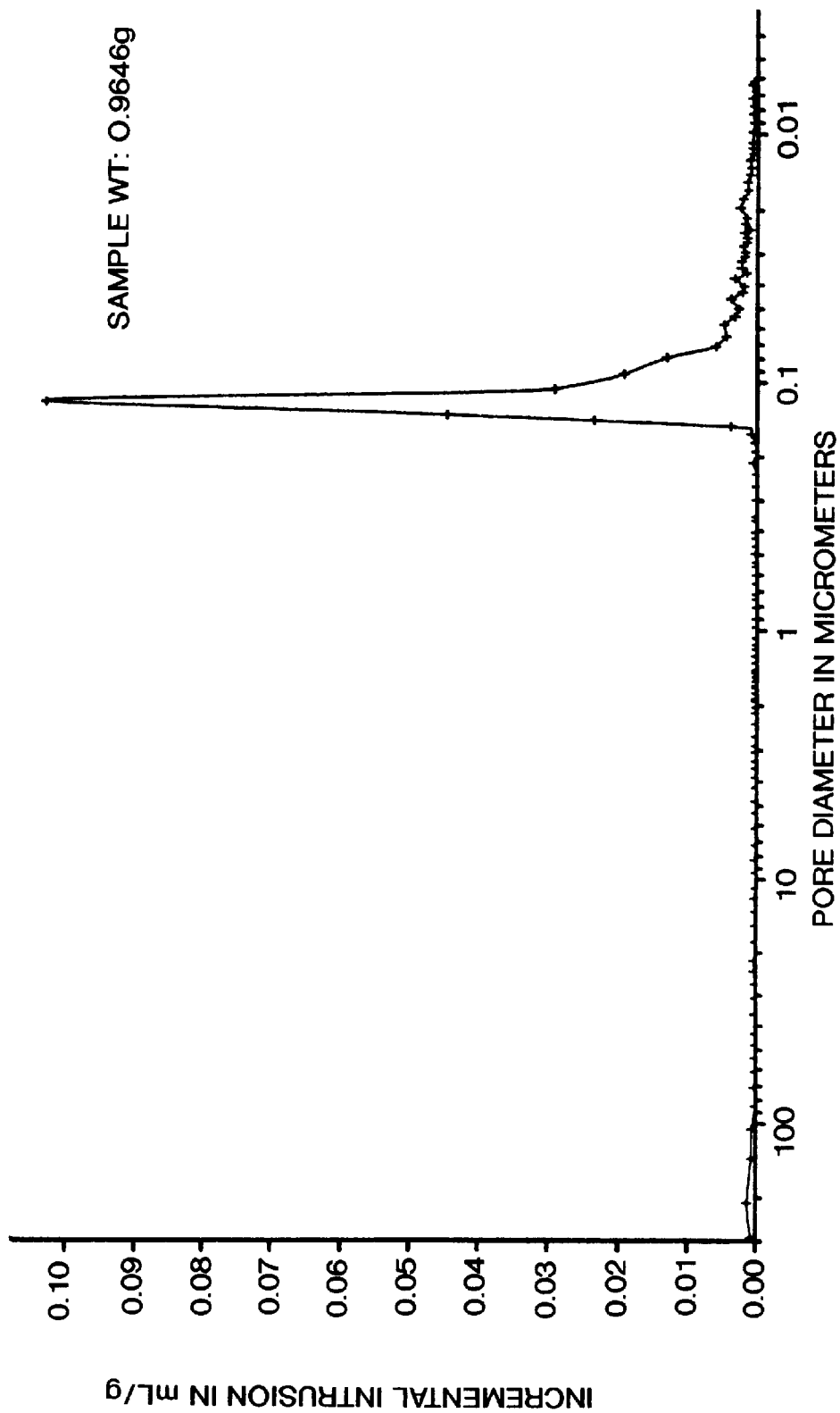
Figure 6:
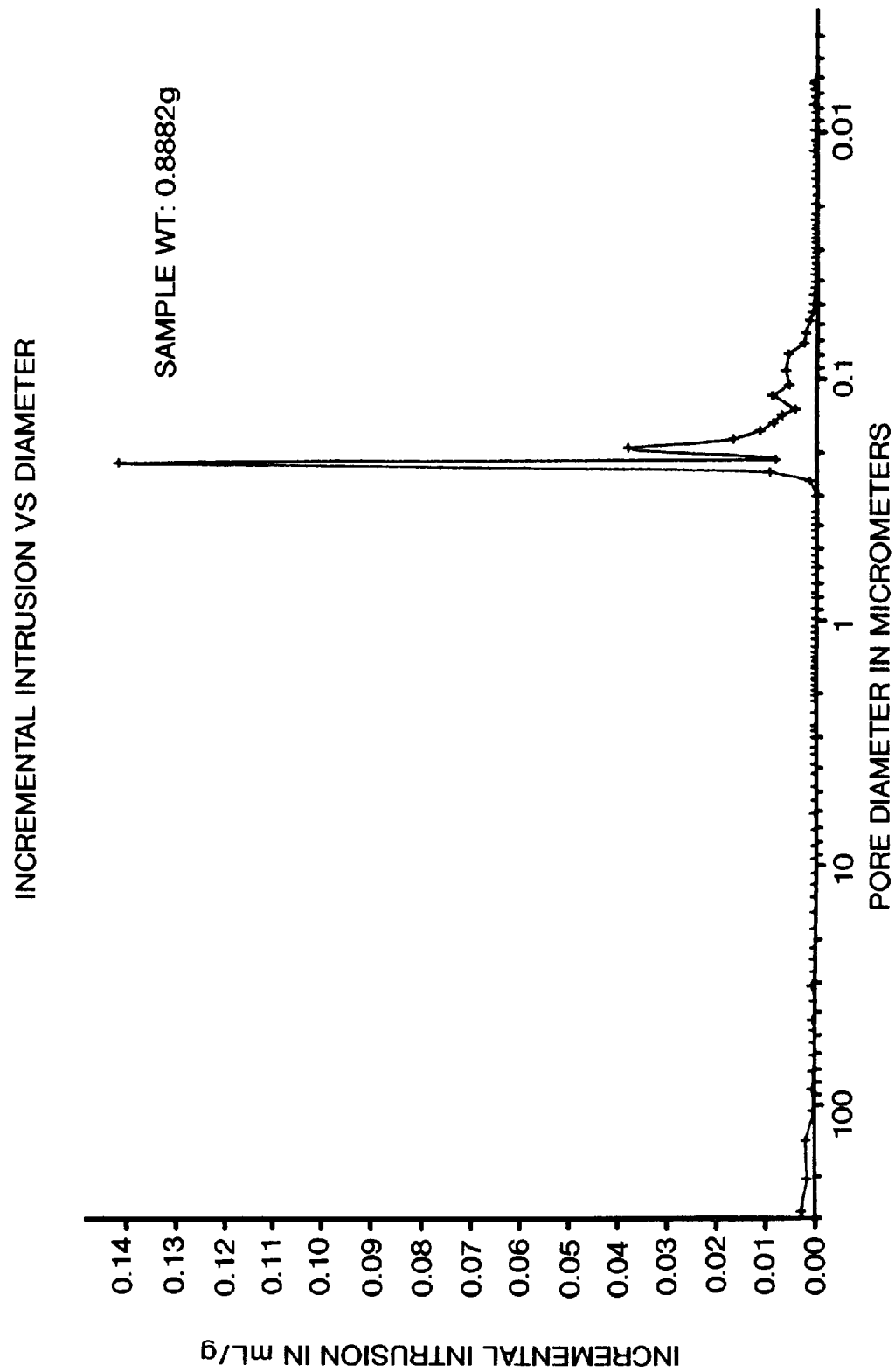
Figure 7:
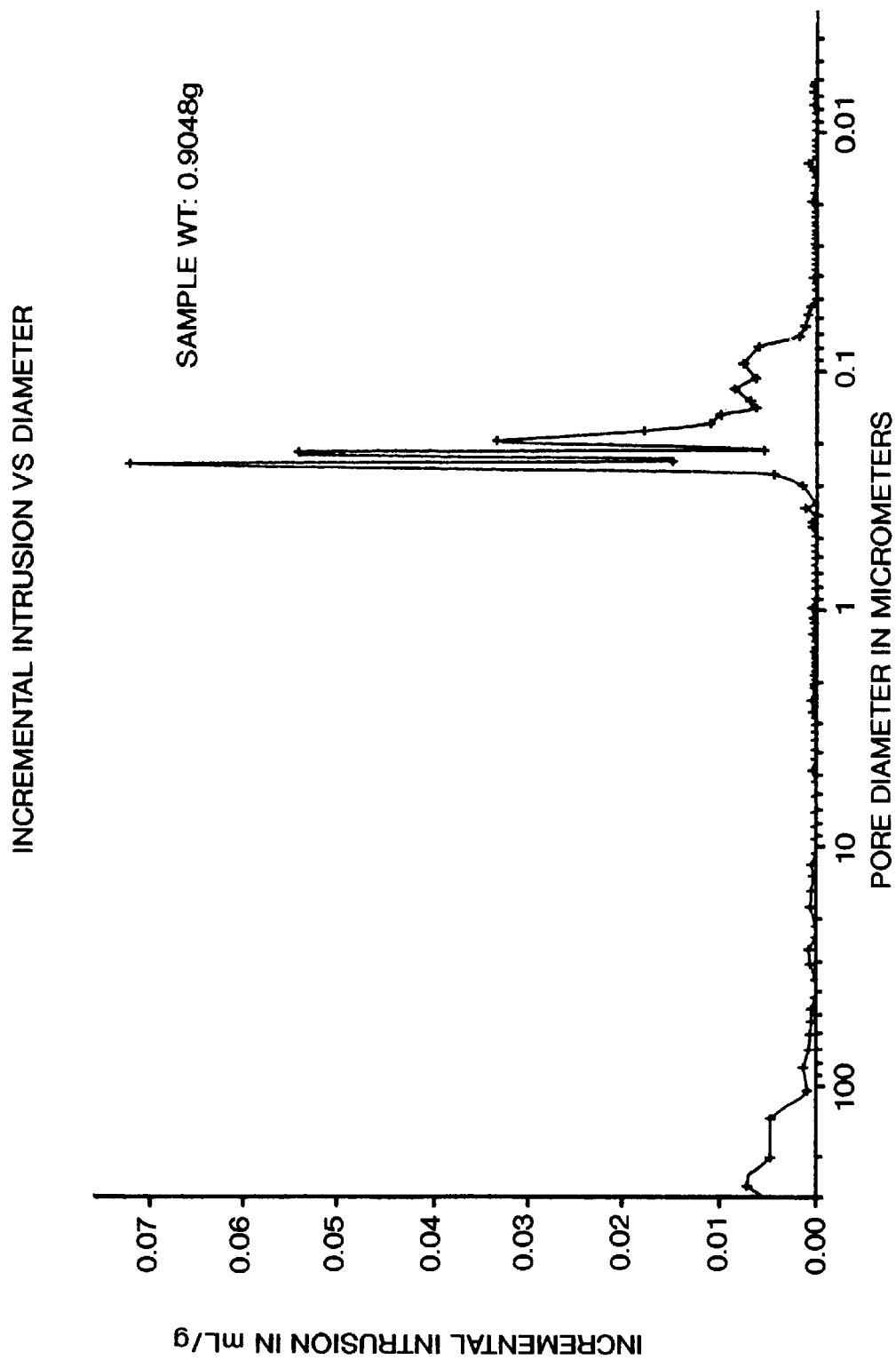
Figure 8:
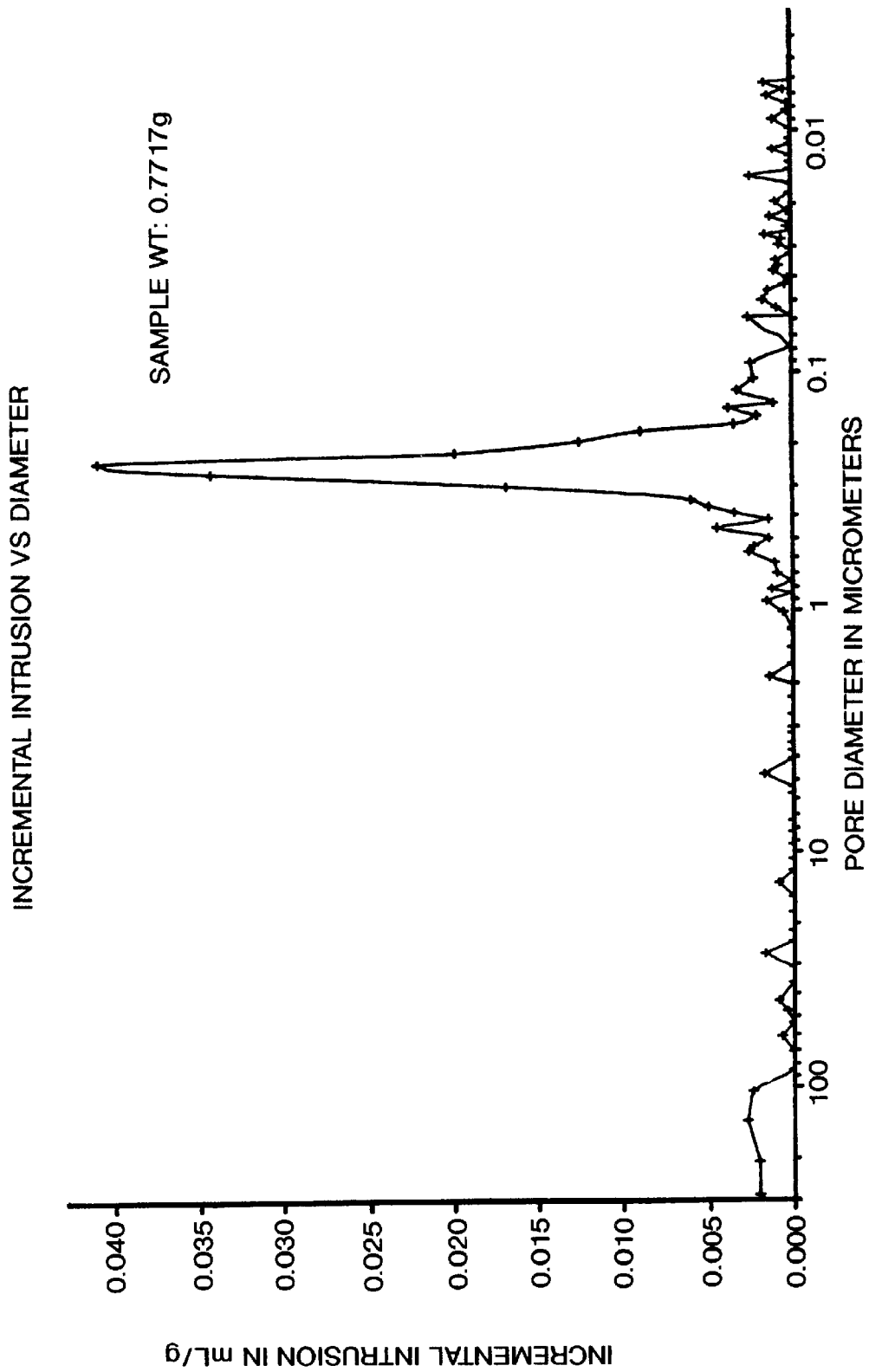
Figure 9:
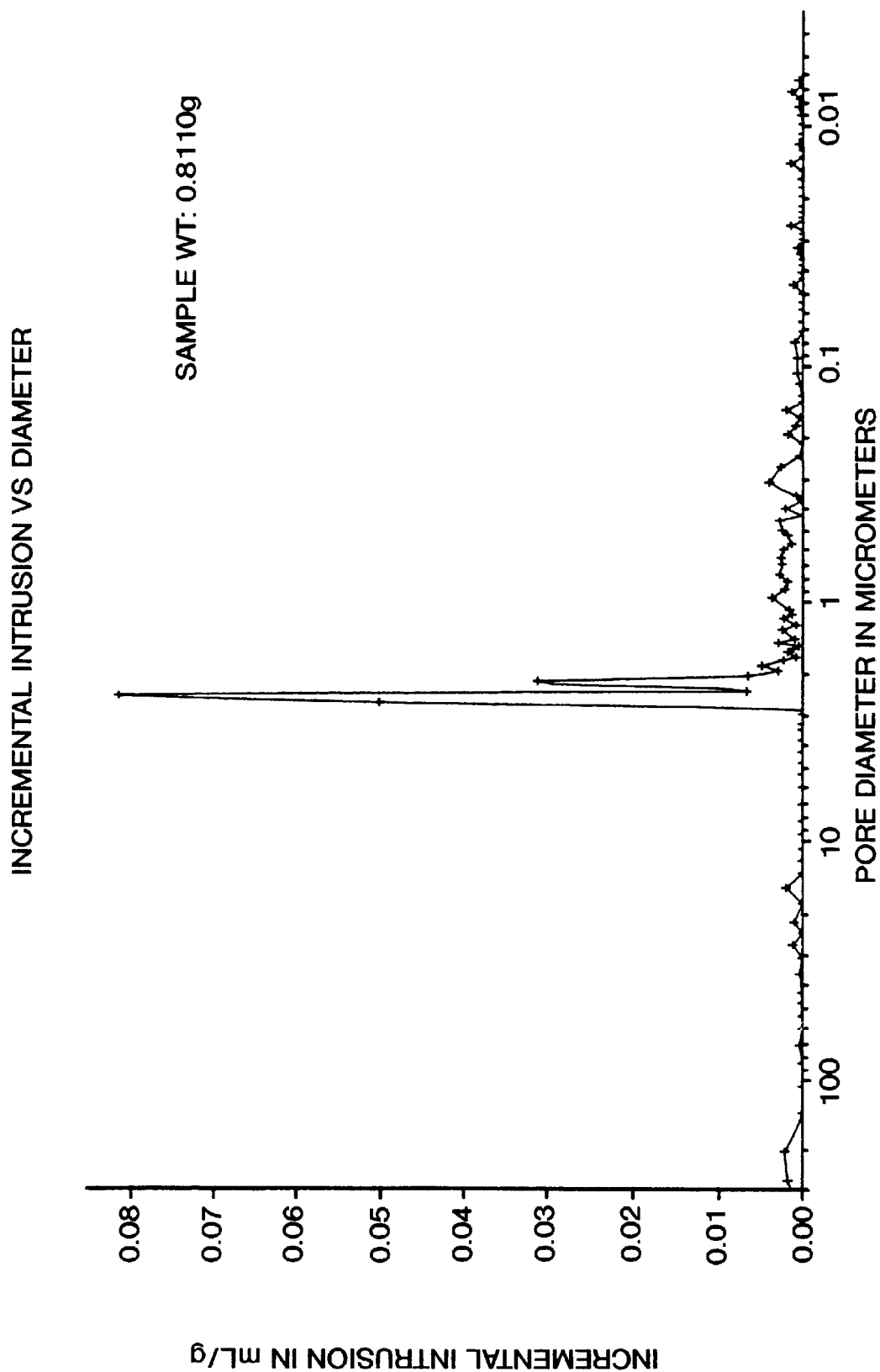
Figure 10:
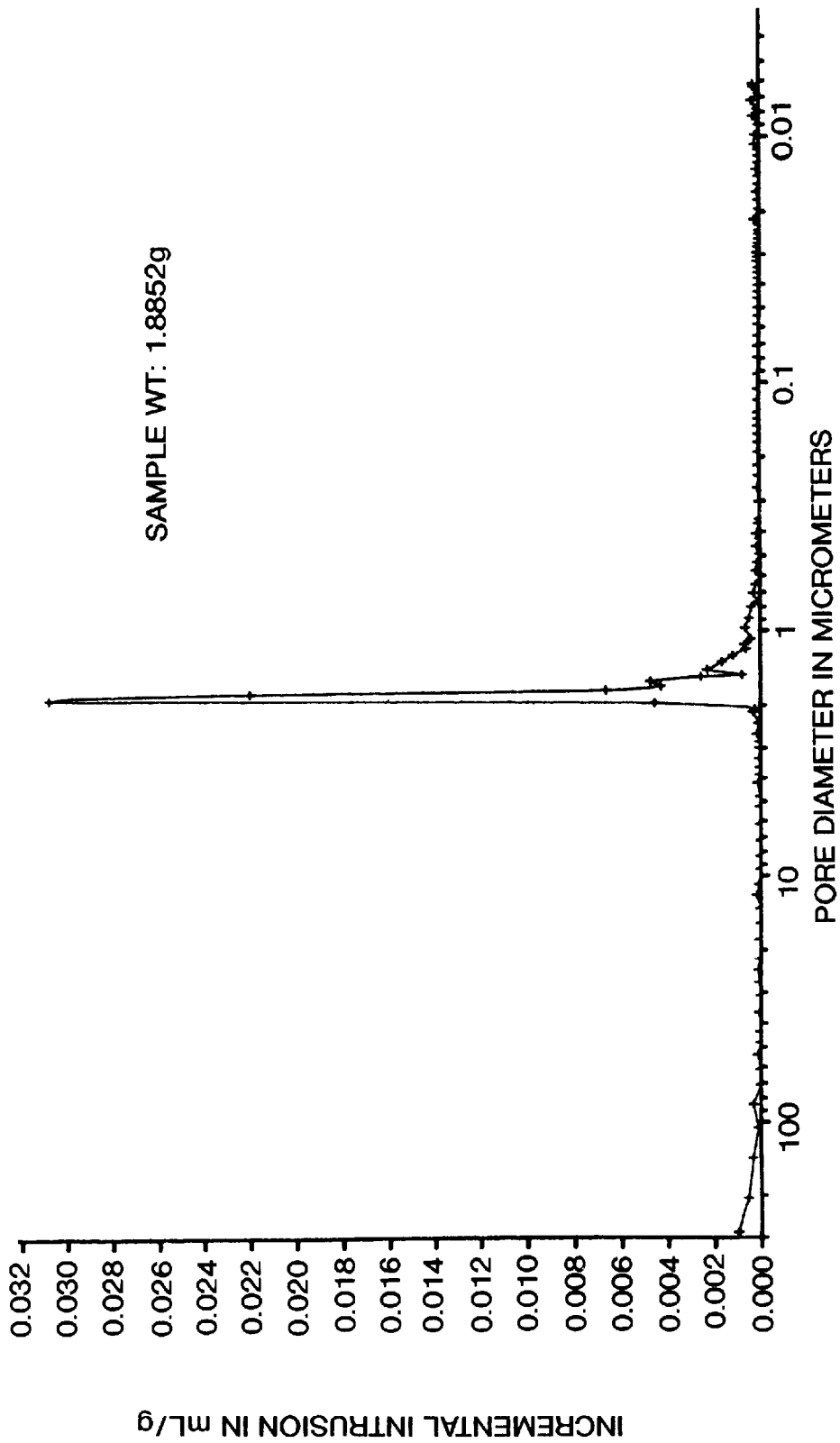
Figure 11:
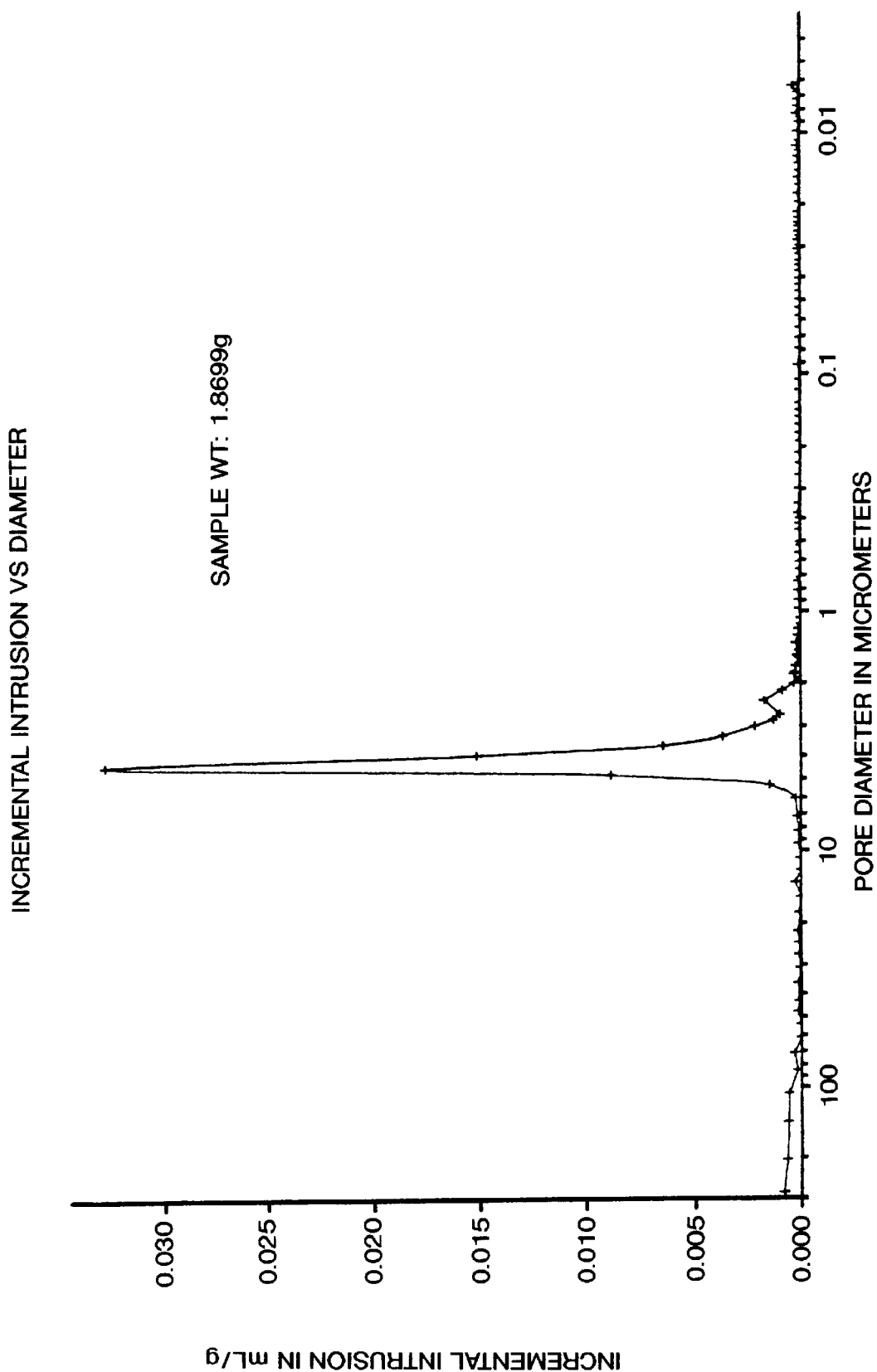
Figure 12:
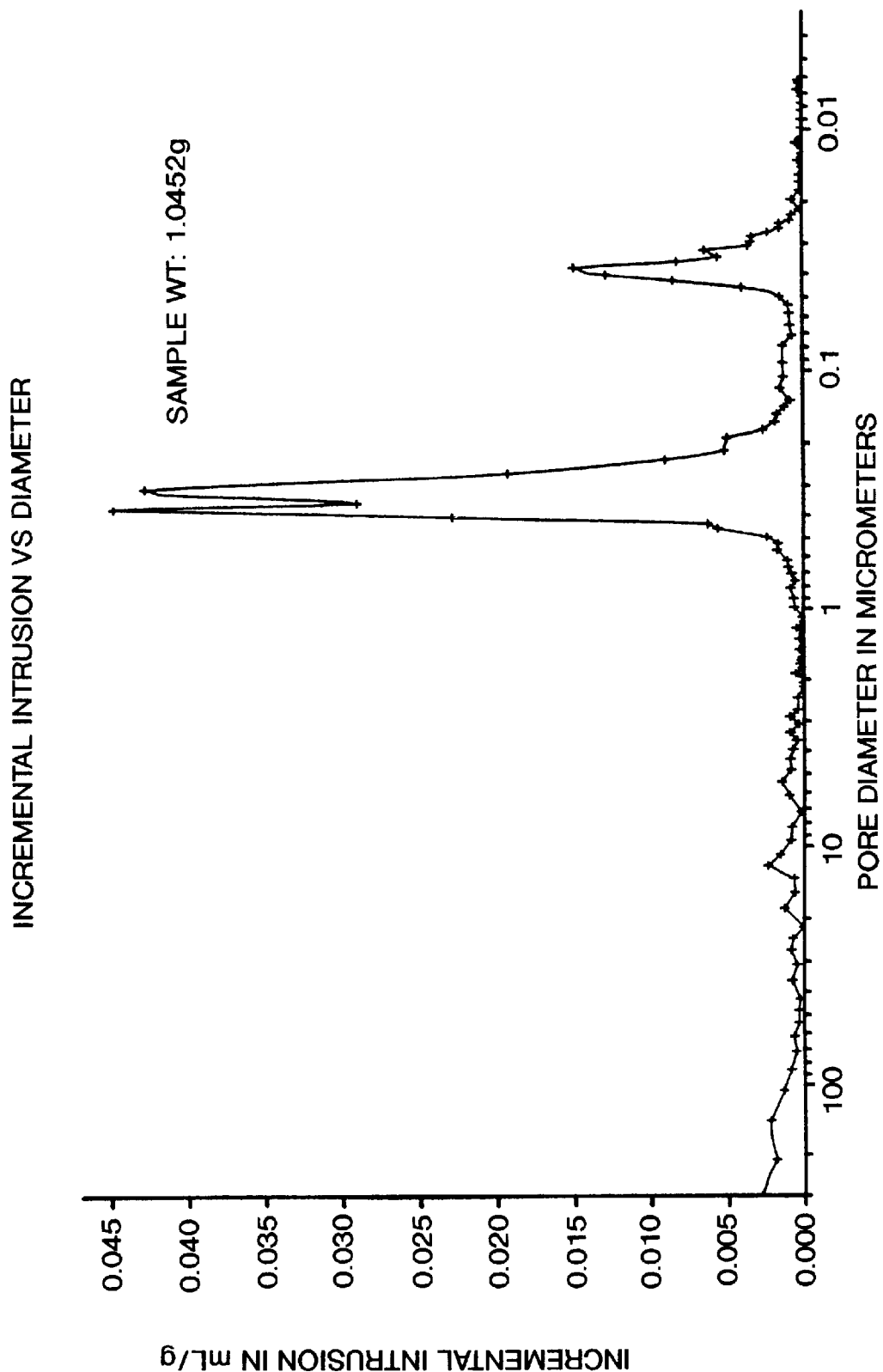

The catalyst supports or catalysts of the invention can be produced as follows:

In a mixing apparatus, preferably provided with heating, for example a kneader, an extruder or a shearing roller extruder, the component A), the inorganic, metallic, organic powders and/or the active components and then the dispersant of component C) or first component C) and then component A) or the components A) and C) together can be added to the polymer of component B) in the molten state at from 80 to 250° C., preferably from 100 to 220° C., particularly preferably from 120 to 200° C. The intimately (intensively) mixed compositions can be shaped, for example, by granulating, pressing, rolling, continuous casting, extrusion or injection molding, in particular by injection molding at from 120 to 250° C., preferably from 140 to 220° C., particularly preferably from 150 to 200° C., and pressures of from 500 to 2000 bar, preferably from 600 to 1800 bar, particularly preferably from 700 to 1600 bar. Here, in a shaping step at injection molding tool temperatures of from 40 to 160° C., preferably from 60 to 150° C., particularly preferably from 80 to 140° C., it is possible to produce catalyst supports or catalysts of any desired shape as a bed of individual parts or as monolith in the form of for example Raschig rings, saddles, star rings, perforated and/or ribbed geometric bodies such as rings, spheres, cuboids, cubes, cones, pyramids, prisms, octahedra, cylinders, truncated pyramids and truncated cones, generally without further shaping.

Wagon wheel profiles, honeycomb profiles, window frame profiles can be extruded to form monoliths at from 120 to 250° C., particularly preferably at from 150 to 200° C.

The green bodies obtained after the shaping process can have the binder removed catalytically in a gaseous, acid-containing atmosphere at from 100 to 160° C., preferably from 100 to 150° C., particularly preferably below the softening point of the polyacetal (component B).

After removal from the mold, the green parts are, according to the present invention, treated in a (gaseous) acid-containing atmosphere for the purpose of removing the binder. For the purposes of the present invention, (gaseous) acid-containing atmospheres can be either pure acids which are gaseous at the treatment temperatures or they can be mixtures of acids with a carrier gas. Suitable carrier gases are, for example, air or nitrogen or noble gases. Suitable acids are inorganic acids which are gaseous at room temperature, eg. the hydrogen halides, hydrogen sulfide or those acids which can be vaporized to a significant extent at the treatment temperatures, eg. nitric acid.

Suitable organic acids are basically those acids or acid mixtures which have a boiling point or sublimation point at atmospheric pressure of below 130° C., eg. oxalic acid, formic acid, acetic acid or trifluoroacetic acid.

However, the green parts after removal from the mold can have the binder removed by heating in a gaseous boron trifluoride-containing atmosphere instead of the gaseous, acid-containing atmosphere. For the purposes of the present invention, gaseous boron trifluoride-containing atmospheres can be either pure boron trifluoride or mixtures of boron trifluoride with a carrier gas. Suitable carrier gases are, for example, air or nitrogen or noble gases.

In place of boron trifluoride, it is of course possible to use adducts of boron trifluoride which can be reversibly dissociated into the starting components without decomposition of the components at the treatment temperatures.

Particularly suitable are the addition compounds of boron trifluoride with ethers, eg. dimethyl ether, diethyl ether, dibutyl ether and tert-butyl methyl ether.

Particular preference is given to nitric acid, anhydrous oxalic acid or oxalic acid dihydrate. Glyoxalic acid is also suitable. Other suitable acids are benzenesulfonic acid, the naphthalenesulfonic acids and maleic acid or mixtures of these. They can be used in the binder removal process either alone or together with a carrier gas such as air, nitrogen or a noble gas.

To aid metering in, it may be advantageous to use the abovementioned acids as solutions in polar solvents, preferably having boiling points below 200° C. Suitable solvents of this type are, in particular, water, isopropanol, acetone, dioxane, ethanol, acetic acid and formic acid.

The acid-catalyzed binder removal can be carried out at atmospheric pressure or under reduced pressure (from 0.001 to 1 bar).

By subsequent presintering, generally at from 600 to 1400° C., preferably from 600 to 1100° C., particularly preferably at from 600 to 800° C., under oxidizing conditions (air), inert gas ($N_2$, Ar, He) or reducing conditions ($N_2/H_2$, $Ar/H_2$), the shaped body can be converted into the catalyst supports or catalysts having their final strength and pore distribution. The presintering process generally considerably increases the stability and the hardness of the porous shaped body. The cutting hardness of the specimens presintered at 800° C. is generally from 1 to 8 kg (800° C.), preferably from 1.5 to 7 kg (800° C.), particularly preferably from 2 to 6 kg (800° C.). In the case of specimens presintered at 1100° C., cutting hardnesses of up to 20 kg are achieved. The water absorption is generally in the range from 0.05 to 5 ml/g, preferably from 0.1 to 3 ml/g, particularly preferably from 0.1 to 1 ml/g, so that more active components can be applied to a catalyst support, of the present invention, generally without significant impairment of the hardness. By means of the calculated active component uptake, the catalysts can readily be recycled after use by reimpregnation with the active components. Besides strictly monomodal pore size distributions, it is also possible to produce polymodal (bimodal, trimodal, tetramodal and higher-modal) pore size distributions in this way. This process enables catalyst supports and catalysts having a high strength and a high thermal or chemical stability to be produced. Conceivable geometries of the shaped bodies are all shapes which can be produced by granulation, rolling, pressing, extrusion or injection molding. The shaped bodies can be used in catalytic reactors as loose material or in the form of monoliths.

The BET specific surface areas of the catalyst supports and catalysts of the present invention are generally from 0.01 to 250 $m^2/g$, preferably from 0.1 to 150 $m^2/g$, particularly preferably from 1 to 100 $m^2/g$, in particular from 2 to 8 $m^2/g$ (800° C.).

The mean pore size is generally determined by the particle size of component A), the inorganic, metallic, organic powder and/or the active components only by means of the interstitial spaces between the powder particles used. The mean pore size and the pore size distribution therefore depend on the mean particle size and the particle size distribution of the powder used. Commercially available metal or ceramic powders enable mechanically stable, crack-free, monomodal or polymodal porous materials, such as the catalyst supports or catalysts of the present invention, to be produced in this way. The narrow pore size distribution can thus be set in the mesopore or macropore range depending on requirements and generally leads to a highly monodisperse pore distribution.

In case polymodal catalyst supports or catalysts are to be obtained, a powder having a polymodal particle size distribution or having internal porosity is used.

The mean particle size of the powder of component A) used according to the invention can generally be a nanocrystline powder of from 5 nm to 500,000 nm, preferably from 300 nm to 100,000 nm, particularly preferably from 500 nm to 50,000 nm, with the particle size of 80%, preferably 90%, particularly preferably 95%, of the particles deviating by from 0 to 30%, preferably from 0 to 20%, particularly preferably from 0 to 10%, from the mean particle size.

Suitable components A) are:
I) an inorganic powder selected from the group of oxides, nitrides, carbides, silicates, aluminosilicates of the elements beryllium, magnesium, calcium, strontium, barium, boron, aluminum, gallium, indium, thallium, silicon, germanium, tin, lead, antimony, selenium, tellurium, polonium, astatine, iron, cobalt, nickel, ruthenium, rhodium, palladium, osmium, iridium, platinum, copper, silver, gold, zinc, cadmium, mercury, scandium, yttrium, lanthanum, actinium, titanium, zirconium, hafnium, vanadinium, niobium, tantalum, chromium, molybdenum, tungsten, manganese, technetium, rhenium, cerium, praseodymium or their mixtures, preferably oxides, nitrides, carbides, silicates of the elements magnesium, calcium, strontium, barium, boron, aluminum, silicon, tin, lead, antimony, iron, cobalt, nickel, ruthenium, rhodium, palladium, platinum, copper, silver, gold, zinc, yttrium, lanthanum, titanium, zirconium, vanadium, niobium, tantalum, chromium, molybdenum, tungsten, manganese, cerium or their mixtures, particularly preferably oxides, nitrides, carbides. of the elements magnesium, calcium, strontium, barium, boron, aluminum, silicon, tin, antimony, iron, cobalt, nickel, copper, yttrium, titanium, zirconium, vanadium, niobium, tantalum, chromium, molybdenum, tungsten, manganese or mixtures thereof,
II) a metallic powder selected from among metals and alloys of the elements boron, aluminum, gallium, indium, thallium, silicon, germanium, tin, lead, antimony, selenium, tellurium, polonium, neodymium, samarium, dysprosium, astatine, iron, cobalt, Raney cobalt, nickel, Raney nickel, ruthenium, rhodium, palladium, osmium, iridium, platinum, copper, silver, gold, zinc, cadmium, mercury, scandium, yttrium, lanthanum, actinium, titanium, zirconium, hafnium, vanadium, niobium, tantalum, chromium, molybdenum, tungsten, manganese, technetium, rhenium, cerium, praseodymium, WC, TiC, TaC, VC or mixtures thereof, WC-cobalt, TiC-cobalt, TaC-cobalt, VC-cobalt or mixtures thereof and also carbon, preferably metals and alloys of the elements boron, aluminum, silicon, tin, lead, antimony, selenium, neodymium, samarium, dysprosium, iron, cobalt, Raney cobalt, nickel, Raney nickel, palladium, platinum, copper, silver, gold, zinc, yttrium, lanthanum, titanium, zirconium, vanadium, niobium, tantalum, chromium, molybdenum, tungsten, manganese, cerium, WC, TiC, TaC, VC or mixtures thereof, WC-cobalt, TiC-cobalt, TaC- cobalt, VC-cobalt or mixtures thereof and also carbon, particularly preferably metals and alloys of the elements boron, aluminum, silicon, tin, neodymium, samarium, dysprosium, iron, cobalt, Raney cobalt, nickel, Raney nickel, copper, zinc, yttrium, titanium, zirconium, vanadium, niobium, tantalum, chromium, molybdenum, tungsten, manganese, WC, TiC, TaC, VC or mixtures thereof, WC-cobalt, TiC-cobalt, TaC-cobalt, VC-cobalt or mixtures thereof, III) an active component selected from the group of the inorganic acids, in particular $H_2SO_4$, $H_3PO_4$, $HNO_3$ and heteropolyacids, the metals selected from among lithium, sodium, potassium, rubidium, cesium, francium, beryllium, magnesium, calcium, strontium, barium, boron, aluminum, gallium, indium, thallium, silicon, germanium, tin, lead, arsenic, antimony, bismuth, selenium, tellurium, polonium, astatine, iron, cobalt, Raney cobalt, nickel, Raney nickel, ruthenium, rhodium, palladium, osmium, iridium, platinum, copper, silver, gold, zinc, cadmium, mercury, scandium, yttrium, lanthanum, actinium, titanium, zirconium, hafuium, vanadium, niobium, tantalum, chromium, molybdenum, tungsten, manganese, technetium, rhenium, cerium, praseodymium, their mixtures or their borates, carbonates, silicates, nitrates, phosphates, arsenates, antimonates, bismuthates, sulfates, selenates, tellurates, vanadates, molybdates, niobates, chromates, oxides, hydroxides, halides, sulfides, selenides, tellurides, nitrides, phosphides, arsenides, acetates, acetylacetonates, palladates, platinates, cyanides, thiocyanates, manganates, rhenates, osmates, carbides, silicides, borides, their ammonium compounds or their mixtures, preferably metals selected from among lithium, sodium, potassium, cesium, magnesium, calcium, strontium, barium, boron, aluminum, silicon, tin, lead, arsenic, antimony, bismuth, selenium, tellurium, polonium, iron, cobalt, Raney cobalt, nickel, Raney nickel, ruthenium, rhodium, palladium, osmium, iridium, platinum, copper, silver, gold, zinc, yttrium, lanthanum, titanium, zirconium, vanadium, niobium, tantalum, chromium, molybdenum, tungsten, manganese, rhenium, cerium, their mixtures or their borates, carbonates, silicates, nitrates, phosphates, arsenates, antimonates, bismuthates, sulfates, selenates, vanadates, molybdates, niobates, chromates, oxides, hydroxides, halides, sulfides, selenides, tellurides, nitrides, phosphides, arsenides, acetates, acetylacetonates, palladate, platinates, manganates, carbides, silicides, borides, their ammonium compounds or their mixtures, particularly preferably metals selected from among lithium, sodium, potassium, cesium, magnesium, calcium, strontium, barium, aluminum, silicon, tin, lead, arsenic, antimony, bismuth, iron, cobalt, nickel, ruthenium, rhodium, palladium, platinum, copper, silver, zinc, titanium, zirconium, vanadium, niobium, tantalum, chromium, molybdenum, tungsten, manganese, cerium, their mixtures or their carbonates, silicates, nitrates, phosphates, arsenates, antimonates, bismuthates, sulfates, vanadates, molybdates, niobates, chromates, oxides, hydroxides, halides, sulfides, nitrides, carbides, their ammonium compounds or their mixtures.

Preferably, as metal one selected from the group of aluminium, iron, cobalt, nickel, palladium, platinum, copper, silver, molybdenum, zinc, titanium, zirconium, tungsten, niobium, chromium and carbon, or as inorganic powder one selected from the group of $Al_2O_3$, MgO, $SiO_2$, $TiO_2$, $Y_2O_3$, $ZrO_2$, ZnO, $Fe_3O_4$, $Fe_2O_3$, CoO, $Co_2O_3$, $Cr_2O_3$, NiO, $B_2O_3$, $Ce_2O_3$, $CeO_2$, $Pr_2O_3$, $B_4C$, SiC, WC, TiC, TaC, $Si_3N_4$, AlN, BN, TiN and ZrN or a mixture of two or more thereof is used, more preferably, as metal one selected from the group of iron, cobalt, nickel, chromium, molybdenum and titanium, or as inorganic powder one selected from the group of SiC, $Si_3N_4$, BN, $B_4C$, WC, TiC, TiN, ZrN and AlN, or a mixture of two or more thereof is used, and in particular as inorganic powder one selected from the group of SiC, $Si_3N_4$ and a mixture thereof are used.

If unsupported catalysts are to be produced, the component A) consists only of active components III) and, if desired, IV), an organic powder selected from the group Teflon or polyimide.

Suitable components B) are:

$B_1$) from 50 to 100% by weight, preferably from 70 to 90% by weight,. particularly preferably from 80 to 88% by weight, of a polyoxymethylene homopolymer or copolymer as is known from EP-A-444 475 and $B_2$) from 0 to 50% by weight, preferably from 10 to 30% by weight, particularly preferably from 12 to 25% by weight, of a polymer homogeneously dissolved in B1) or dispersed in B1) at a mean particle size of less than 1 $\mu$m, preferably poly-1,3-dioxolane, poly-1,3-dioxane, poly-1,3-dioxepane, particularly preferably poly-1,3-dioxepane.

Suitable organic binders are polyacetal binders, for example polyoxymethylene which advantageously has a molecular weight of from 10,000 to 500,000. Apart from homopolymers of formaldehyde or trioxane, other suitable binders are copolymers of trioxane with, for example, cyclic ethers such as ethylene oxide and 1,3-dioxolane or formals such as 1,3-dioxepane, 1,3-dioxane, or mixtures thereof, or homopolymeric poly-1,3-dioxolane, poly-1,3- dioxane, or poly-1,3-dioxepane, with the amounts of the copolymers generally being from 10 to 30% by weight of the polymers.

In addition, they can contain auxiliaries such as thermoplastic binders such as polyethylene, polymethyl methacrylate or polyethylene oxide and dispersants or lubricants such as polyethylene glycol, stearic acid, fatty alcohols, polyvinylpyrrolidone or polyvinyl alcohol. The amount of auxiliaries is generally from 0.1 to 12% by weight of the total mass.

Suitable components C) are dispersants as are known from EP-A-444 475, for example organic carboxylic acids, amines, amides or maleimides, stearic acid, polyvinylpyrrolidone, polyvinyl alcohol, polyethylene glycol, polypropylene glycol, polyethylene oxide and montan waxes, preferably organic carboxylic acids, amines, amides or maleimides, polyethylene glycol and polyethylene oxide, particularly preferably organic carboxylic acids, amines, maleimides, polyethylene glycol and polyethylene oxide.

The mixtures used for producing (mixing together) the catalyst supports or catalysts of the present invention generally comprise or consist of from 15 to 70% by weight, preferably from 30 to 70% by weight, particularly preferably from 50 to 65% by weight, of component A), from 30 to 85% by weight, preferably from 30 to 70% by weight, particularly preferably from 35 to 50% by weight, of component B) and from 0 to 15% by weight, preferably from 1 to 12% by weight, particularly preferably from 2 to 8% by weight, of component C).

Suitable support materials are ceramic, metallic or organic powders of AI, II and IV.

In the case of the unsupported catalyst, the active components can be used directly as powder or in the case of supported catalysts they can be applied to the inorganic powder I), the metallic powder II), the organic powder IV) or mixtures thereof, or subsequently to the support material, or can be compounded together with the support material.

Furthermore, inorganic or organic fibers or whiskers of, for example, $Al_2O_3$, $SiO_2$, SiC, $Si_3N_4$, C or mixtures thereof can be added to the compositions.

In the preparative process of the present invention, the components A) are generally deagglomerated with the aid of a dispersant C) and the thus uniformly sized starting powder particles are incorporated at a comparatively high component A) content into an organic binder [component B)]. The organic binder fills the generally almost uniformly sized and regularly arranged interstitial spaces between the powder particles. The macropores in the range around 100 μm present in the starting powder of the component A) as a result of agglomerate formation are generally eliminated by the deagglomeration. Removal of the organic binder and the organic dispersant leaves, when powders having a narrow monomodal particle size distribution are used, very uniformly sized pores between the powder particles. In general, the mean pore diameter is 25% of the mean particle diameter of the powder used (see table [unit: dm/kg]). When using powders having a polymodal particle size distribution or when using porous powders, polymodal (bimodal, trirodal, tetramodal or higher-modal) pore distributions can also be produced, with the pore size being determined by the interstitial spaces between the powder particles and by the internal porosity of the powder particles.

The catalysts of the present invention can be heterogeneous supported catalysts or unsupported catalysts. Unsupported catalysts consist of catalytically active material. Supported catalysts can be produced by coating inert porous ceramic or metallic catalyst supports with catalytically active components or precursors of catalytically active components by steeping, impregnation, spray impregnation, spray drying, precipitating on, hicoating, washcoating.

Furthermore, the present invention relates to a monomodal or polymodal catalyst support or catalyst, obtainable by shaping a mixture of A) from 15 to 70% by volume of
   I) an inorganic powder selected from the group of oxides, nitrides, carbides, silicates, aluminosilicates of the elements beryllium, magnesium, calcium, strontium, barium, boron, aluminum, gallium, indium, thallium, silicon, germanium, tin, lead, antimony, selenium, tellurium, polonium, astatine, iron, cobalt, nickel, ruthenium, rhodium, palladium, osmium, iridium, platinum, copper, silver, gold, zinc, cadmium, mercury, scandium, yttrium, lanthanum, actinium, titanium, zirconium, haflium, vanadinium, niobium, tantalum, chromium, molybdenum, tungsten, manganese, technetium, rhenium, cerium, praseodymium or mixtures thereof and/or
   II) a metallic powder selected from among metals and alloys of the elements boron, aluminum, gallium, indium, thallium, silicon, germanium, tin, lead, antimony, selenium, tellurium, polonium, neodymium, samarium, dysprosium, astatine, iron, cobalt, Raney cobalt, nickel, Raney nickel, ruthenium, rhodium, palladium, osmium, iridium, platinum, copper, silver, gold, zinc, cadmium, mercury, scandium, yttrium, lanthanum, actinium, titanium, zirconium, hafnium, vanadinium, niobium, tantalum, chromium, molybdenum, tungsten, manganese, technetium, rhenium, cerium, praseodymium, WC, TiC, TaC, VC or mixtures thereof, WC-cobalt, TiC-cobalt, TaC-cobalt, VC-cobalt or mixtures thereof and also carbon and/or
   III) an active component selected from the group of the inorganic acids, the metals selected from among lithium, sodium, potassium, rubidium, cesium, francium, beryllium, magnesium, calcium, strontium, barium, boron, aluminum, gallium, indium, thallium, silicon, germanium, tin, lead, arsenic, antimony, bismuth, selenium, tellurium, polonium, astatine, iron, cobalt, Raney cobalt, nickel, Raney nickel, ruthenium, rhodium, palladium, osmium, iridium, platinum, copper, silver, gold, zinc, cadmium, mercury, scandium, yttrium, lanthanum, actinium, titanium, zirconium, hafnium, vanadinium, niobium, tantalum, chromium, molybdenum, tungsten, manganese, technetium, rhenium, cerium, praseodymium, mixtures thereof, or their borates, carbonates, silicates, nitrates, phosphates, arsenates, antimonates, bismutates, sulfates, selenates, tellurates, vanadates, molybdates, niobates, chromates, oxides, hydroxides, halides, sulfides, selenides, tellurides, nitrides, phosphides, arsenides, acetates, acetylacetonates, palladates, platinates, cyanides, thiocyanates, manganates, rhenates, osmates, carbides, silicides, borides, their ammonium compounds or their mixtures and/or
   IV) an organic powder selected from the group teflon or polyimide B) from 30 to 85% by volume of a mixture of
   $B_1$) from 50 to 100% by weight of a polyoxymethylene homopolymer or copolymer and
   $B_2$) from 0 to 50% by weight of a polymer homogeneously dissolved in $B_1$) or dispersed in $B_1$) at a mean particle size of less than 1 μm and C) from 0 to 15% by volume of a dispersant, removing the binder by treatment with a gaseous acid at from 100 to 160° C., residue pyrolysis at from 400 to 600° C. and subsequent presintering at from 600 to 1400° C. and, if desired, applying active components III to the component A) or to the presintered composition by single or multiple steeping, impregnation, spray impregnation, precipitating on, hicoating, washcoating or spray drying, wherein the catalyst support or catalyst after the pyrolytic removal of the binder has a BET specific surface area of from 0.01 to 250 $m^2$/g and a pore size distribution of from 50 to 300,000 nm measured by the mercury pressure porosimetry method.

The catalyst supports or catalysts of the present invention are, in general, suitable for use in:

reductions (hydrogenations), for example:
is hydrogenation of alkynes, for example the selective hydrogenation of acetylene in $C_2$, $C_3$, $C_4$ mixtures, the selective hydrogenation of vinylacetylenes in $C_4$ fractions and the hydrogenation of butynediol to give butenediol or butanediol, the hydrogenation of alkenes, for example the hydrogenation of unsaturated compounds in the oxo process, aminative hydrogenation, hydrogenation of aromatics, diolefin hydrogenation such as the hydrogenation of diolefins in pyrolysis gasoline, fat hydrogenation, hydrogenative desulfrization such as the hydrogenation of inorganic sulfur compounds, eg. COS, $CS_2$, $SO_2$ and $S_x$ to give hydrogen sulfide, hydrogenative refining of aromatics or paraffins, the hydrogenation of organic chlorine compounds, the hydrogenation of aldehydes, carboxylic acids, carboxylic esters, ketones, nitriles, nitro compounds, oximes and oxo products, for example the reduction of nitrobenzene to give aniline, the hydrogenation of carbonyl groups and aromatics, eg. for producing white oil, the hydrogenation of trimethylquinone to give trimethylhydroquinone, the hydrogenation of adipodinitrile to give hexamethylenediamine, acrylonitrile, $NH_3$ and the hydrogenation of adipic acid to give hexanediol, the hydrogenation of cyclohexyl hydroperoxide to cyclohexanol, the hydrogenation of citral to give citronellal, the preparation of lilial from dehydrolilial, the removal of $NO_x$ from waste gases by reduction with ammonia and the preparation of alkanes, olefins, alcohols, aldehydes and/or carboxylic acids from synthesis gas, the hydrogenation of adipodinitrile to give aminocapronitrile, the aminative hydrogenation of adipic acid to give aminocapronitrile;

oxidations (dehydrogenations), for example:
oxidations of alkanes such as the dehydrogenation of ethylbenzene to give styrene or of dimethylcyclohexylamine to give 2,6-dimethylaniline, of alkenes, of alcohols, for example the dehydrogenation of cyclohexanol to give cyclohexanone and the preparation of ethylhexanoic acid and ethylhexanal from ethylhexenol, ammonoxidation such as the preparation of hydrogen cyanide from methane or of o-xylene to give phthalodinitrile, of aromatics, epoxidation, oxidative halogenation, oxidative coupling, oxidation of hydrogen sulfide-containing gases to suilfr by the Claus process, the preparation of vinyl chloride by the oxychlorination process (Stauffer process), the oxidation of hydrogen sulfide and/or organic sulfur compounds to sulfur dioxide, the preparation of sulfuric acid by the contact process from $SO_2$-containing gases, the preparation of phthalic anhydride from o-xylene and air, the catalytic combustion of hydrocarbons, solvents or CO-contaminated waste gas, the preparation of ethylene dichloride by oxychlorination of ethylene, the oxidation of propene to give acrylic acid, the preparation of methacrylic acid from methacrolein, the preparation of methacrylic acid from isobutyric acid, the dehydrogenation of DMCHA to give xylidine and the dehydrogenation of trimethylcyclohexenone to give trimethylphenol, the oxidation of ethylene to ethylene oxide, the oxidation of butadiene to furan, the oxidation of propene to acrolein, the oxidation of methacrolein to methacrylic acid;

acid- or base-catalyzed reactions, for example:
alkoxylations, eg. of ethylene oxide or propylene oxide, dealkoxylations, eg. of N-vinylformamide from α-methoxyethylformamide, alkylations, acylations, hydrations, dehydrations, eg. of aziridine from ethanolamine or of hydrocyanic acid from formamide, aminations, aldol reactions, oligomerizations, polymerizations, polymer-analogous reactions, cyclizations, isomerizations, esterifications, cracking of gaseous hydrocarbons, eg. of natural gas using steam and possibly $CO_2$, the oxidation of propene to acrolein, elimination reactions such as N-formylalanine nitrile to give N-vinylformamide, additions such as methanol or propyne to α-methoxy groups.

Also suitable are macroporous supports having a pore size from 100 to 100,000 nm for removing combustion residues (soot) from diesel exhausts and for bioreactors in combination with the use of bacteria (from 1 to 2 μm).

The catalyst supports or catalysts produced by the process of the present invention have comparatively high mechanical strengths and are therefore particularly suitable for fluidized bed reactions.

Fluidized bed reactions can be used, for example, for the rearrangement of cyclohexanoneoxime to give ε-caprolactam, the ammonoxidations of, for example, toluene to give benzonitrile or of propene to give acrylonitrile, the preparation of maleic anhydride from butene or the preparation of aniline from nitrobenzene.

Thus, the present invention also relates to a method of preparing chlorine from hydrogen chloride in a non-steady-state Deacon process by using the monomodal or polymodal catalyst support or catalyst, a method of reacting ethyl benzene to give styrene in a non-steady-state oxydehydrogenation by using the monomodal or polymodal catalyst support or catalyst, a method of preparing aziridine form ethanol amine by using the monomodal or polymodal catalyst support or catalyst, a method of reacting trimethyl cyclohexenon to give trimethylphenol by using the monomodal or polymodal catalyst support or catalyst, a method of reducing by using the monomodal or polymodal catalyst support or catalyst, a method of hydrogenating by using the monomodal or polymodal catalyst support or catalyst, a method of oxidizing by using the monomodal or polymodal catalyst support or catalyst, a method of dehydrogenating by using the monomodal or polymodal catalyst support or catalyst, a method of carrying out acid- or base-catalyzed reactions by using the monomodal or polymodal catalyst support or catalyst, a method of carrying out fluidized bed reaction by using the monomodal or polymodal catalyst support or catalyst, a method of removing combustion residues from diesel exhaust gases by using the monomodal or polymodal catalyst support or catalyst, a method of removing $NO_x$ from waste gases by using the monomodal or polymodal catalyst support or catalyst, a method of carrying out reactions in bioreactors in the presence of bacteria by using the monomodal or polymodal catalyst support or catalyst, and a method of carrying out reactions in the presence of a biocatalyst by using the monomodal or polymodal catalyst support as a catalyst support with immobilized enzymes or microbes.

In the above methods the catalyst support or catalyst referred to is the catalyst support or catalyst of the present invention.

EXAMEPLES

Examples 1 to 9

The ceramic powders from Table I were kneaded at 180° C. with a binder based on polyacetal, comprising a polyoxymethylene copolymer (POM/PBDF) of trioxane and 2.5% by weight of butanediol formal having an average molecular weight of 150,000, and with 20% by weight of polybutanediol formal having a molecular weight of 50,000 and 5% by weight (based on the powder used) of polyethylene glycol having a molecular weight of 800 as auxiliary. The kneaded compositions of the powders No. 1, 2, 7, 8 from Table I were processed into granules using a cutter mill. The kneaded compositions of the powders No. 3, 4, 5, 6, 9 from Table I were extruded at 180° C. to give extrudates having a diameter of 4 mm. The granules and the extrudates were subjected to binder removal in a HERAEUS binder removal oven (60 l) using 70 ml/h of a 5% strength by weight solution of oxalic acid in acetic acid (99% strength) or 30 ml/h of 100% strength nitric acid at 140° C. under a $N_2$ stream of 300 l/h for 10 hours, with the polyoxymethylene depolymerizing to give formaldehyde. The extrudates and the granules were then presintered in air in a muffle furnace or rotary tube furnace at the temperatures indicated in Table II. The pore radius distributions and further properties of the extrudates and the granules are shown in Tables IIIa and IIIb.

TABLE I

| Example No. | Powder | Description | Powder content [Vol. %] | Amount of powder [g] | Polyacetal [g] | PBDF [g] | PEG [g] | PE [g] | PMMA [g] | PEO [g] |
|---|---|---|---|---|---|---|---|---|---|---|
| 1 | $Al_2O_3$ | ALCOA CT3000SG | 56 | 1000 | 162 | 41 | 50 | 50 | 50 | 50 |
| 2 | $Al_2O_3$ | ALCOA CT1200 | 56 | 1000 | 162 | 41 | 50 | 50 | 50 | 50 |
| 3 | $ZrO_2$ | TOSOH TZ-3YS | 50 | 1000 | 127 | 32 | 50 | 50 | 50 | 50 |
| 4 | SiC | HC STARCK UF15 | 50 | 1000 | 281 | 70 | 50 | 50 | 50 | 50 |
| 5 | 90% $Si_3N_4$ | HC STARCK LC12 | 50 | 900 | 276 | 69 | 50 | 50 | 50 | 50 |
|  | 5% $Y_2O_3$ | HC STARCK grade fine | — | 50 | — | — | — | — | — | — |
|  | 5% $Al_2O_3$ | ALCOA CT3000SG | — | 50 | — | — | — | — | — | — |
| 6 | 90% SiC | HC STARCK UFB10 | 50 | 900 | 266 | 66 | 50 | 50 | 50 | 50 |
|  | 10% $ZrO_2$ | TOSOH, TZ-3YS | — | 100 | — | — | — | — | — | — |
| 7 | SiC | NORTON, FCP13NLC | 49 | 1000 | 295 | 74 | 50 | 50 | 50 | 50 |
| 8 | Al2O3 | ALCOA, CT3000SG | 56 | 1000 | 162 | 41 | 50 | 50 | 50 | 50 |
| 1 | $Al_2O_3$ | ALCOA CT3000SG | 56 | 1000 | 162 | 41 | 50 | 50 | 50 | 50 |
| 9 | Al2O3 | ALCOA, tabular | 50 | 1000 | 219 | 55 | 50 | 50 | 50 | 50 |
| 10 | Fe | BASF, CEP | 57 | 1000 | 92 | 55 | 50 | 10 |  | 20 |
| 11 | 316L | HC STARCK, 316L | 64 | 1000 | 64 |  |  |  | 7 | 20 |
| 12 | $ZrO_2$ | MEL, E101 | 35 | 1000 | 276 | 69 | 50 |  |  |  |

PBDF: Polybutanediol formal, molecular weight = 50,000
PE: Polyethylene, molecular weight = 150,00, d = 0.95 g/ml
PMMA: Polymethyl methacrylate, molecular weight = 150,000, d = 1.17 g/ml, Lucryl G88 UV1 (BASF)
PEG: Polyethylene glycol, molecular weight = 800
PEO: Polyethylene oxide, molecular weight = 400

TABLE II

| Example No. | Powder | Description | Mean particle size [μm] | Sintering temperature [° C.] | Sintering time [h] | Pore size distribution FIG. No. |
|---|---|---|---|---|---|---|
| 1a | $Al_2O_3$ | ALCOA CT3000SG | 0.7 | 600 | 2 | 1a,d,e |
| 1b | $Al_2O_3$ | ALCOA CT3000SG | 0.7 | 800 | 2 | 1b |
| 1c | $Al_2O_3$ | ALCOA CT3000SG | 0.7 | 1100 | 2 |  |
| 1d | $Al_2O_3$ | ALCOA CT3000SG | 0.7 | 1200 | 2 | 1a,d,e |
| 1e | $Al_2O_3$ | ALCOA CT3000SG | 0.7 | 1400 | 2 | 1a,d,e |
| 2 | $Al_2O_3$ | ALCOA CT1200 | 1.2 | 900 | 2 | 2 |
| 3 | $ZrO_2$ | TOSOH TZ-3YS | 0.4 | 800 | 2 | 3 |
| 4 | SiC | HC STARCK UF15 | 0.4 | 800 | 2 | 4 |
| 5 | 90% $Si_3N_4$ | HC STARCK, LC12 | 0.6 | 1000 | 2 | 5 |
|  | 5% $Y_2O_3$ | HC STARCK, grade fine | 0.5 |  |  |  |
|  | 5% $SiO_3$ | ALCOA CT3000SG | 0.7 |  |  |  |
| 6 | 90% SiC | HC STARCK UFB10 | 0.4 | 800 | 2 | 6 |
|  | 10% $ZrO_2$ | TOSOH, TZ-3YS | 0.4 | — | — | — |
| 7 | SiC | NORTON FCP13NLC | 0.8 | 800 | 2 | 7 |
| 8 | $Al_2O_3$ | ALCOA CT3000SG | 0.7 | 850 | 0,5 | 8 |
| 9 | $Al_2O_3$ | ALCOA TABULAR | 1–10 | 800 | 2 | 9 |
| 10 | Fe | BASF,CEP | 4 | 600 | 2 | 10 |

TABLE II-continued

| Example No. | Powder | Description | Mean particle size [μm] | Sintering temperature [° C.] | Sintering time [h] | Pore size distribution FIG. No. |
|---|---|---|---|---|---|---|
| 11 | 316L (Fe,Cr,Ni,Mo) | HC STARCK, 316L | 10.0 | 1000 | 1 | 11 |
| 1a | $Al_2O_3$ | ALCOA CT3000SG | 0.7 | 600 | 2 | 1a,d,e |
| 12 | $ZrO_2$ | MEL. E101 | 1.2 | 800 | 2 | 12 |
| B | $Al_2O_3$ $Al_2O_3$ | ALCOA, CT3000SG RHONE POULENC SPH12 | 0.7 | 800 | 2 | 13 |

TABLE IIIa

| Ex. No. | dm [nm] | dm/PS | d10 [nm] | d10/dm | d50 [nm] | d50/dm | d80 [nm] | d80/dm | d90 [nm] | d95 [nm] | d95/dm |
|---|---|---|---|---|---|---|---|---|---|---|---|
| 1a | 149 | 0.21 | 150 | 1.0 | 140 | 0.9 | 106 | 0.7 | 45 | 11 | 0.1 |
| 1b | 144 | 0.21 | 170 | 1.2 | 145 | 1.0 | 118 | 0.8 | 80 | 36 | 0.3 |
| 1c | 136 | 0.19 | | | | | | | | | |
| 1d | 143 | 0.20 | 190 | 1.3 | 128 | 0.9 | 120 | 0.8 | 100 | 72 | 0.5 |
| 1e | 123 | 0.18 | 201 | 1.6 | 123 | 1.0 | 107 | 0.9 | 93 | 80 | 0.7 |
| 2 | 465 | 0.39 | 590 | 1.3 | 470 | 1.0 | 270 | 0.6 | 100 | 24 | 0.1 |
| 3 | 148 | 0.37 | 154 | 1.0 | 144 | 1.0 | 119 | 0.8 | 65 | 30 | 0.2 |
| 4 | 156 | 0.39 | 165 | 1.1 | 154 | 1.0 | 117 | 0.8 | 93 | 75 | 0.5 |
| 5 | 123 | 0.21 | 135 | 1.1 | 120 | 1.0 | 93 | 0.8 | 58 | 38 | 0.3 |
| 6 | 226 | 0.57 | 240 | 1.1 | 220 | 1.0 | 162 | 0.7 | 110 | 80 | 0.4 |
| 7 | 229 | 0.29 | 330 | 1.4 | 235 | 1.0 | 172 | 0.8 | 130 | 100 | 0.4 |
| 8 | 253 | 0.36 | 665 | 2.6 | 265 | 1.0 | 200 | 0.8 | 85 | 27 | 0.1 |
| 9 | 2527 | 0.00 | 2800 | 1.1 | 2600 | 1.0 | 1100 | 0.4 | 474 | 171 | 0.1 |
| 10 | 1850 | 0.46 | 1940 | 1.0 | 1870 | 1.0 | 1650 | 0.9 | 1422 | 1073 | 0.6 |
| 1a | 149 | 0.21 | 150 | 1.0 | 140 | 0.9 | 106 | 0.7 | 45 | 11 | 0.1 |
| 11 | 4422 | 0.44 | 5200 | 1.2 | 4300 | 1.0 | 3600 | 0.8 | 2830 | 1955 | 0.4 |
| 12 | 350 | 0.29 | bimodal pore distribution with maxima at 40 nm and 350 nm | | | | | | | | |
| B | 144 224 | 0.21 | 170 628 | 1.2 2.8 | 145 227 | 1.0 1.0 | 118 185 | 0.8 0.8 | 80 165 | 36 145 | 0.3 0.6 |

Mercury pressure porosimetry using AutoporeII 9220 V3.03 in accordance with DIN 66133
PS: mean particle size
dm: mean pore diameter
d10 = pore diameter at 10% of the total pore volume
d50 = pore diameter at 50% of the total pore volume
d80 = pore diameter at 80% of the total pore volume
d90 = pore diameter at 90% of the total pore volume
d95 = pore diameter at 95% of the total pore volume
WHH = width at half height of the pore size distribution TABLE IIIb

| Ex. No. | WHH [nm] | WHH/dm | TPV [ml/g] | TPA [m²/g] | CH [kg] | Abrasion [%] | WA [ml/g] | BET [m²/g] |
|---|---|---|---|---|---|---|---|---|
| 1a | 19 | 0.1 | 0.21 | 17.0 | | | | 6.0 |
| 1b | 20 | 0.1 | 0.22 | 13.5 | 2.6 | 11.1 | 0.20 | 5.8 |
| 1c | | | 0.17 | 5.7 | 16.0 | 0.7 | 0.2 | 4.3 |
| 1d | 20 | 0.1 | 0.16 | | | | | |
| 1e | 20 | 0.2 | 0.05 | 1.7 | | | | |
| 2 | 90 | 0.2 | 0.19 | 6.5 | 2.8 | 1.9 | 0.2 | 2.1 |
| 3 | 12 | 0.1 | 0.18 | 9.0 | 2.6 | 11.1 | 0.2 | 5.8 |
| 4 | 17 | 0.1 | 0.29 | 16.4 | | | 0.70 | 19.9 |
| 5 | 24 | 0.2 | 0.31 | 18.1 | 2.4 | | | 17.1 |
| 6 | 14 | 0.1 | 0.30 | 8.7 | 2.5 | | | 11.3 |
| 7 | 43 | 0.2 | 0.30 | 6.8 | | | | 32.4 |
| 8 | 70 | 0.3 | 0.2 | 7.9 | | | | 5.9 |
| 9 | 260 | 0.1 | 0.3 | 3.3 | | | | 1.7 |
| 10 | 100 | 0.1 | 0.09 | 1.1 | | | | 0.4 |
| 1a | 19 | 0.1 | 0.21 | 17.0 | | | | 6.0 |
| 11 | 700 | 0.2 | 0.09 | 0.8 | | | | 0.1 |
| 12 | 110 | 0.3 | 0.33 | 12.5 | | | | 0.1 |

TABLE IIIb-continued

| Ex. No. | WHH [nm] | WHH/dm | TPV [ml/g] | TPA [m²/g] | CH [kg] | Abrasion [%] | WA [ml/g] | BET [m²/g] |
|---|---|---|---|---|---|---|---|---|
| B | 20 | 0.1 | 0.22 | 13.5 | 2.6 | 11.1 | 0.20 | 5.8 |
|   | 135 | 0.6 | 0.55 | 12.2 |   |   |   |   |

CH: cutting hardness
WA: water absorption
BET: specific surface area in accordance with DIN 66131
Abrasion: abrasion determination
TPV: total pore volume (300–0.005 μm)
TPA: total pore area (300–0.005 μm)
WHH/dm: width at half height of the pore size distribution/mean pore volume

Examples 10 and 11

The metal powders No. 10 (BASF, CEP) and No. 11 (HC STARCK, 316L, Fe—Cr—Ni—Mo) from Table IV were kneaded at 180° C. with a binder based on polyacetal, comprising a polyoxymethylene copolymer (POM/PBDF) of trioxane and 1.5% by weight of butanediol formal having an average molecular weight of 150,000, and with about 10% by weight of polyethylene or polymethyl methacrylate, both having a molecular weight of 150,000, and 2% by weight (based on the powder used) of polyethylene oxide having a molecular weight of 400 as auxiliary, granulated via a kneader discharge screw and subjected to binder removal in a HERAEUS binder removal oven (60 l) using 70 ml/h of a 5% strength by weight solution of oxalic acid and acetic acid (99% strength) or 30 ml/h of 100% strength nitric acid at 140° C. under an $N_2$ stream of 300 l/h for 10 hours, with the polyoxymethylene being depolymerized to give formaldehyde. The granules were then presintered in air at the temperatures indicated in Table V. The pore radius distributions and further properties of the granules are shown in Tables VIa and VIb.

Example 12

The bimodal $ZrO_2$ powder (MEL, E101, 60% of particles having d=1.3 μm, 40% of particles having d<1.0 μm) from Table IV, No. 10 was extruded at 180° C. together with a binder based on polyacetal, granulated and subjected to binder removal in a HERAEUS binder removal oven (60 l) using 55 ml/h of a 5% strength by weight solution of oxalic acid and acetic acid (99% strength) or 30 ml/h of 100% strength nitric acid at 140° C. under an $N_2$ stream of 300 l/h for 10 hours, with the polyoxymethylene being depolymerized to give formaldehyed. The granules were then presintered in air at the temperatures indicated in Table V. The pore radius distributions and further properties of the granules are shown in Tables VIa and VIb.

TABLE IV

| Example No. | Powder | Description | Powder content [Vol-%] | Amount of powder [g] | Polyacetal [g] | PBDF [g] | PE [g] | PMMA [g] | PEG [g] | PEO [g] |
|---|---|---|---|---|---|---|---|---|---|---|
| 10 | Fe | BASF CEP | 57 | 1000 | 92 |   | 10 |   |   | 20 |
| 11 | 316L | HC STARCK 316L | 64 | 1000 | 64 |   |   | 7 |   | 20 |
| 12 | $ZrO_2$ | MEL E101 | 35 | 1000 | 276 | 69 |   |   | 50 |   |

Polyacetal: Copolymer of trioxane and 2.5% of butanediol formal, molecular weight 150,000
PBDF = Polybutanediol formal, molecular weight 50,000
PE = Polyethylene, molecular weight 150,000, d = 0.95 g/ml
PMMA = Polymethyl methacrylate, molecular weight 150,000, d = 1.17 g/ml, Lucryl G88 UVl [BASF]
PEG = Polyethylene glycol, molecular weight 800
PEO = Polyethylene oxide, molecular weight 400

TABLE V

| Example No. | Powder | Description | Mean particle size [μm] | Sintering temperature [° C.] | Sintering time [h] | Pore size distribution FIG. NO. |
|---|---|---|---|---|---|---|
| 10 | Fe | BASF CEP | 4 | 600 | 2 | 10 |
| 11 | 316L | HC STARCK 316L | 10 | 1000 | 1 | 11 |
| 12 | $ZrO_2$ | MEL E101 | 0.9 | 800 | 2 | 12 |

TABLE VIa

| Ex. No. | dm nm | dm/PS | d10 nm | d10/dm | d50 | d50/dm | d80 | d80/dm | d90 | d95 | d95/dm |
|---|---|---|---|---|---|---|---|---|---|---|---|
| 10 | 1850 | 0.46 | 1940 | 1.0 | 1870 | 1.0 | 1650 | 0.9 | 1422 | 1073 | 0.6 |
| 11 | 4422 | 0.44 | 5200 | 1.2 | 4300 | 1.0 | 3600 | 0.8 | 2830 | 1955 | 0.4 |
| 12 | 350/40 | 0.39 | | | bimodal pore distribution | | | | | | |

Mercury pressure porosimetry using Autopore II 9220 V3.03 in accordance with DIN 66133
PS = mean particle size
dm = mean pore diameter
d10 = pore diameter at 10% of the total pore volume
d50 = pore diameter at 50% of the total pore volume
d80 = pore diameter at 80% of the total pore volume
d90 = pore diameter at 90% of the total pore volume
d95 = pore diameter at 95% of the total pore volume TABLE VIb

| Ex. No. | WHH [nm] | WHH/dm | TPV [ml/g] | TPA [m²/g] | BET surface area [m²/g] |
|---|---|---|---|---|---|
| 10 | 100 | 0.05 | 0.09 | 1.1 | 0.4 |
| 11 | 600 | 0.14 | 0.09 | 0.8 | 0.1 |
| 12 | | | 0.33 | 12.5 | |

Mercury pressure porosimetry using Autopore II 9220 V3.03 in accordance with DIN 66133
WHH = width at half height of the pore size distribution
dm = mean pore diameter
TPV = total pore volume (from 300 to 0.005 μm)
TPA = total pore area (from 300 to 0.005 μm)

Comparative Example A 650 g of SiC (HC STARCK, UF15) were kneaded with 150 g of $H_2O$ and 48 g of $HNO_3$ for 35 minutes and extruded at from 45 to 150° C. to form 4 mm extrudates.

The extrudates were calcined in air at 800 and 1100° C. During calcination, the extrudates disintegrated into powder (cutting hardness=0 kg).

Comparative Example B

Figure 13:
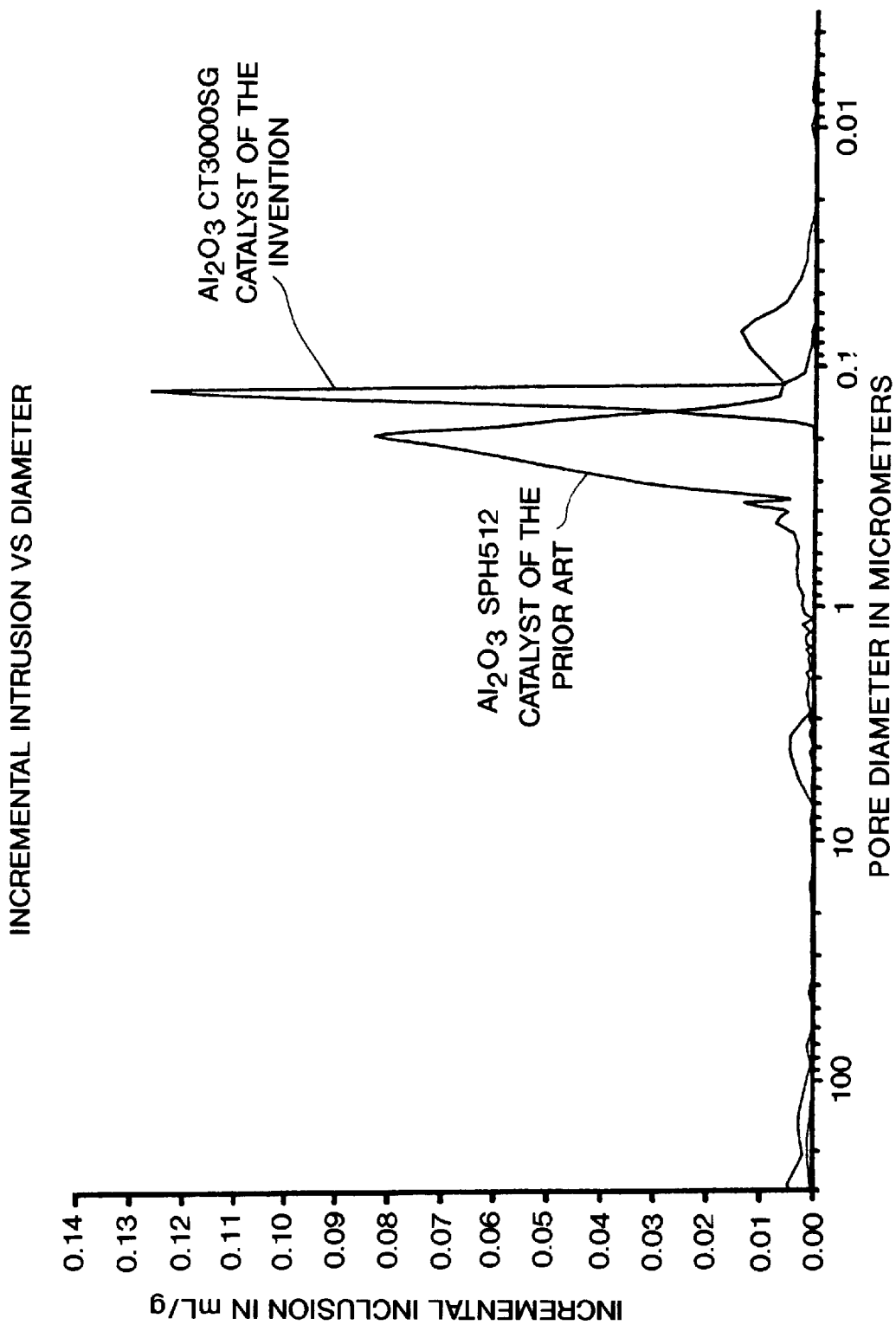

The commercial α-$Al_2O_3$ catalyst support SPHS12 from Rhone Poulenc has, at a comparative BET of 5.4 m²/g and a total pore volume (TPA) of 0.51 ml/g, a significantly broader pore distribution (see FIG. 13) than the $Al_2O_3$ catalyst support CT3000SG from ALCOA used according to the present invention and shown in Table IIIa and IIIb, Examples No. 16 and FIG. 16.

Comparative Example C

After conventional kneading and extruding, the $ZrO_2$ support has a lower hardness.

300 g of $ZrO_2$ powder (starting material from Example 3) from TOSOH, TZ-3YS, and 9 g of extrusion aid were admixed with 31 ml of water, densified in a kneader for 2.5 hours and subsequently shaped in an extruder to give 3 mm solid extrudates. The extrudates were dried for 2 hours at 120° C. and subsequently calcined in air for 2 hours at 800° C. (same calcination temperature as in Example 3).

The following properties were measured on the solid extrudates:

| Example | C | 3 |
|---|---|---|
| Cutting hardness [kg] | 0.6 | 2.6 |
| BET surface area [m²/g] | 5.8 | 5.8 |
| Water absorption [ml/g] | 0.22 | 0.19 |
| Tamped density [g/ml] | 1.455 | 1.543 |

Comparative Example D

Significantly lower hardness of a conventional $ZrO_2$ support even at high calcination temperatures.

100 g of high-surface-area $Zr(OH)_4$ (BET: 310 m²/g) was admixed with 3 g of extrusion auxiliary and 45 ml of water and densified for 1.5 hours in a kneader. Attempts to shape this $ZrO_2$ support by extrusion were unsuccessful, sitce the extrudates disintegrated back into powder on drying (cutting hardness=0 kg). Therefore, the unextruded kneaded composition was calcined for 2 hours at 500° C. The BET surface area of the powder after calcination at 500° C. was 69.8 m²/g. Calcination for 2 hours at 800° C. gave a BET of 11.2 m²/g.

Example 13 [non-steady-state Deacon process]
Catalyst
Cu—K—Fe—Na on SiC support
Production of the SiC support 1000 g of SiC (NORTON, FCP-13-NLC) were kneaded at 180° C. with a binder based on polyacetal, comprising 281 g of polyoxymethylene copolymer (POM/PDF) of trioxane and 2.5% by weight of butanediol formal having an average molecular weight of 150,000, and with 70 g of polybutanediol formal having a molecular weight of 50,000 and 50 g of polyethylene glycol having a molecular weight of 800 as auxiliary, extruded, granulated and subjected to binder removal in a HERAEUS binder removal oven (60 l) using 70 ml/h of a 5% strength by weight solution of oxalic acid in acetic acid (99% strength) or 30 ml/h of 100% strength nitric acid at 140° C. under an $N_2$ stream of 300 l/h for 10 hours. The granules were then presintered at 600° C. for 2 hours under $N_2$. This gave an SiC support having a BET surface area of 17.1 m²/g and a water absorption of 0.342 ml/g.
Impregnation of the SiC support 300 g of the SiC support were impregnated twice with 102.6 ml each time of a solution of 95.99 g of $CuCl_2.2H_2O$ and 41.97 g of KCl dissolved in distilled water (total solution 205.2 ml), dried for 16 hours at 120° C. (after each impregnation step) and calcined for 3 hours at 450° C.

307 g of the previously impregnated SiC support were impregnated three times with 105 ml each time of a solution of 37.39 g of NaCl and 172.99 g of $FeCl_3.6H_2O$ dissolved in distilled water (total solution 315 ml), dried for 16 hours at 120° C. (after each impregnation step) and calcined for 3 hours at 450° C. This gave a reddish brown granular material having the chemical composition 8.1% by weight of iron and 6.4% by weight of copper.

General procedure for the non-steady-state preparation of chlorine

A heated tube reactor having a 20 ml fixed catalyst bed was charged with a catalyst size fraction of 0.5–1 mm. After the loading phase using a dry HCl stream and a subsequent flushing phase using inert gas ($N_2$ or $CO_2$), regeneration (dechlorination) was carried out using air or pure oxygen. This cycle was repeated.

The HCl concentration and the chlorine concentration were measured continuously at high time resolution using on-line IR analysis and on-line UV analysis respectively. The integrated amount of chlorine liberated during dechlorination could, for checking purposes, be additionally determined by wet chemical methods (iodometrically). The results are summarized in Table VII.

Comparative Example C
Cu—Fe—K on $Al_2O_3$ support

Using a method similar to the general procedure for the non-steady-state preparation of chlorine, the comparative catalyst Cu—Fe—K on $Al_2O_3$ was loaded at 365° C. and HCl gas flows from 4 to 5 standard l/h containing 25% of HCl (the support did not withstand higher HCl concentrations) at an HCl breakthrough time of from 10 to 14 minutes. The dechlorination was carried out using 20 standard l/h of air at a regeneration temperature of 365° C. at dechlorination times of 60 minutes and an integrated amount of chlorine of 0.9 g, which corresponded to a space-time yield of 34 kg chlorine/t cat·h.

If the dechlorination was carried out using 20 standard l/h of air at a regeneration temperature of 380° C., dechlorination times of 35 minutes and an integrated amount of chlorine of 0.7 g were found, corresponding to a space-time yield of 38 kg chlorine/t catch.

At a reactor temperature of 400° C. during loading and dechlorination, a maximum chlorine concentration of 8% by

TABLE VII

HCl loading: 100% on catalyst Cu—K—Fe—Na on SiC; cocurrent flushing using 30 standard l/h of $N_2$; regeneration using pure $O_2$

| | Loading | | | | | Dechlorination | | | | | | |
|---|---|---|---|---|---|---|---|---|---|---|---|---|
| Cycle | Reactor temperature [° C.] | Space velocity [$h^{-1}$] | HCl breakthrough [min] | Loading time [min] | Flushing [min] | Reactor temperature [° C.] | Maximum chlorine concentration [vol. %] | Mean chlorine concentration [vol. %] | Maximum residual HCl concentration [vol. %] | Mean residual HCl concentration [vol. %] | Space velocity [$h^{-1}$] | Dechlorination time [min] | Total space/time yield [kg $Cl_2$/t cat · h] |
| 13 | 380 | 500 | 8.5 | 8.5 | 5 | 400 | 33.1 | 25.2 | 1.1 | 0.9 | 250 | 11 | 63 |
| 14 | 380 | 500 | 8.5 | 8.5 | 4 | 400 | 34 | 25.9 | 1.1 | 1 | 250 | 10.3 | 64.7 |
| 16 | 380 | 500 | 8.5 | 8.5 | 4 | 400 | 36.3 | 28.3 | 1.3 | 1.1 | 250 | 11 | 74.6 |
| 17 | 380 | 500 | 8 | 7.5 | 3 | 400 | 33.6 | 25 | 1.5 | 1.3 | 250 | 11 | 69.8 |
| 18 | 380 | 500 | 8 | 7.5 | 2.4 | 400 | 34.5 | 27 | 2 | 1.7 | 250 | 10.7 | 76.8 |
| 19 | 380 | 500 | 8 | 7.5 | 2.4 | 400 | 34.6 | 26.5 | 1.7 | 1.5 | 250 | 11 | 76.4 |
| 20 | 380 | 500 | 8 | 7.5 | 2.4 | 400 | 30.1 | 24.1 | 1.3 | 1 | 350 | 8 | 79.3 |
| 21 | 380 | 500 | 8 | 7.5 | 2.4 | 400 | 30.1 | 24 | 1.4 | 1.2 | 350 | 9 | 85 |
| 22 | 380 | 500 | 8 | 7.5 | 2.4 | 400 | 26.4 | 21.7 | 1.2 | 0.9 | 500 | 7.2 | 94 |
| 23 | 380 | 500 | 8 | 7.5 | 2.4 | 400 | 27.2 | 21.9 | 1.1 | 0.9 | 500 | 7 | 93.2 |
| 24 | 380 | 500 | 8 | 7.5 | 2.4 | 400 | 24.4 | 19.8 | 1 | 0.75 | 600 | 6 | 90 |
| 25 | 380 | 750 | 6.5 | 6.5 | 2.4 | 400 | 27.3 | 21.7 | 1 | 0.9 | 600 | 6.8 | 114 |
| 26 | 380 | 750 | 6.5 | 5.5 | 2.4 | 400 | 27.4 | 22.7 | 0.9 | 0.8 | 600 | 6.5 | 122.8 |
| 27 | 380 | 750 | 6.5 | 5.5 | 2.4 | 400 | 26.7 | 21.8 | 0.9 | 0.7 | 600 | 6.4 | 116.2 |
| 28 | 380 | 750 | 6.5 | 5.5 | 2.4 | 405 | 28.8 | 23 | 1 | 0.8 | 600 | 6.2 | 120.9 |
| 29 | 380 | 750 | 6.5 | 5.5 | 2.4 | 405 | 31.5 | 24.2 | 0.9 | 0.8 | 600 | 6.8 | 135.9 |
| 30 | 370 | 750 | 6.5 | 5.5 | 2.4 | 405 | 25.5 | 21.2 | 0.9 | 0.7 | 600 | 6 | 107.9 |
| 31 | 390 | 750 | 5 | 5 | 2.4 | 405 | 27.2 | 20 | 1.3 | 0.8 | 600 | 6.5 | 109.6 |
| 32 | 400 | 750 | 5 | 5 | 2.4 | 400 | 23.3 | 18.8 | 1.2 | 0.8 | 600 | 6.8 | 105.3 |

Dechlorination time to a chlorine concentration of <10 vol. %; 4 minutes flushing time between dechlorination and loading Comparative Example E [non-steady-state Deacon process]

Comparative catalyst
(Cu—Fe—K on $Al_2O_3$ support)

200 g of $Al_2O_3$ (Pural SCF rings) were impregnated with 92 ml of a solution of 32.16 g of $CuCl_2.2H_2O$ 58 g of $FeCl_3.6H_2O$ 30 g of KCl and 114 ml of water (water absorption=0.46 ml/g), dried for 16 hours at 120° C., calcined for 3 hours at 450° C. and subsequently impregnated with the remaining 85 ml of solution, dried for 16 hours at 120° C. and calcined for 3 hours at 450° C. The comparative catalyst C contained 3.8% by weight of Cu and 4.5% by weight of Fe; tamped density: 0.974 g/ml (0.5–1 mm size fraction); BET surface area: 68.6 $m^2$/g.

An attempt to impregnate the catalyst for a third time resulted in it disintegrating.

volume of $Cl_2$ and a mean chlorine concentration of 4% by volume of $Cl_2$ at dechlorination times (to <2% by volume of chlorine) of 25 minutes were obtained. The to integrated amount of chlorine liberated was 1 g. The maximum measured space-time yield was 40 kg chlorine/t cat·h.

We claim:

1. A monomodal or polymodal catalyst support or catalyst having a BET specific surface area of from 0.01 to 250 $m^2$/g and a monomodal or polymodal pore size distribution having a mean pore diameter of from 50 to 300,000 nm measured by the mercury pressure porosimetry method, wherein the pore size distribution fulfills at least one of the following conditions (a) to (d)

a) from 10 to 95% of the pore volume is from about 0.1 to 3 times the mean pore diameter, b) from 10 to 80% of the pore volume is from about 0.4 to 3 times the mean pore diameter, c) from 50 to 95% of the pore volume is from about 0.1 to 1 times the mean pore diameter, and
d) from 50 to 80% of the pore volume is from about 0.4 to 1 times the mean pore diameter, and the condition e) the width at half height of the pore size distribution is less than 0.5 times the mean pore diameter.

2. A process for producing a monomodal or polymodal catalyst support or catalyst as defined in claim 1, comprising the steps of shaping a mixture of
A) from 15 to 70% by volume of at least one of
I) an inorganic powder selected from the group of oxides, nitrides, carbides, silicates, aluminosilicates of the elements beryllium, magnesium, calcium, strontium, barium, boron, aluminum, gallium, indium, thallium, silicon, germanium, tin, lead, antimony, selenium, tellurium, polonium, astatine, iron, cobalt, nickel, ruthenium, rhodium, palladium, osmium, iridium, platinum, copper, silver, gold, zinc, cadmium, mercury, scandium, yttrium, lanthanum, actinium, titanium, zirconium, haffium, vanadinium, niobium, tantalum, chromium, molybdenum, tungsten, manganese, technetium, rhenium, cerium, praseodymium and mixtures thereof,
II) a metallic powder selected from compounds, metals and alloys of the elements boron, aluminum, gallium, indium, thallium, silicon, germanium, tin, lead, antimony, selenium, tellurium, polonium, neodymium, samarium, dysprosium, astatine, iron, cobalt, Raney cobalt, nickel, Raney nickel, ruthenium, rhodium, palladium, osmium, iridium, platinum, copper, silver, gold, zinc, cadmium, mercury, scandium, yttrium, lanthanum, actinium, titanium, zirconium, hafijum, vanadinium, niobium, tantalum, chromium, molybdenum, tungsten, manganese, technetium, rhenium, cerium, praseodymium, WC, TiC, TaC, VC and mixtures thereof, WC-cobalt, TiC-cobalt, TaC-cobalt, VC-cobalt and mixtures thereof and also carbon,
III) an active component selected from the group of the inorganic acids, the metals lithium, sodium, potassium, rubidium, cesium, francium, beryllium, magnesium, calcium, strontium, barium, boron, aluminum, gallium, indium, thallium, silicon, germanium, tin, lead, arsenic, antimony, bismuth, selenium, tellurium, polonium, astatine, iron, cobalt, Raney cobalt, nickel, Raney nickel, ruthenium, rhodium, palladium, osmium, iridium, platinum, copper, silver, gold, zinc, cadmium, mercury, scandium, yttrium, lanthanum, actinium, titanium, zirconium, haffium, vanadinium, niobium, tantalum, chromium, molybdenum, tungsten, manganese, technetium, rhenium, cerium, praseodymium, mixtures thereof, and their borates, carbonates, silicates, nitrates, phosphates, arsenates, antimonates, bismutates, sulfates, selenates, tellurates, vanadates, molybdates, niobates, chromates, oxides, hydroxides, halides, sulfides, selenides, tellurides, nitrides, phosphides, arsenides, acetates, acetylacetonates, palladates, platinates, cyanides, thiocyanates, manganates, rhenates, osmates, carbides, silicides, borides, and ammonium compounds and all mixtures component thereof, and
IV) an organic powder selected from the group of teflon and polyimide
B) as a binder from 30 to 85% by volume of a mixture of
$B_1$) from 50 to 100% by weight of a polyoxymethylene homopolymer or copolymer and
$B_2$) from 0 to 50% by weight of a polymer homogeneously dissolved in $B_1$) or dispersed in $B_1$) at a mean particle size of less than 1 μm and
C) from 0 to 15% by volume of a dispersant,
removing the binder by treatment with a gaseous acid at from 100 to 160° C. in order to form a residue,
pyrolysing the residue at from 400 to 600° C. and
subsequent presintering at from 600 to 1400° C. and,
optionally, applying active components III to the component A) or to the presintered composition by single or multiple steeping, impregnating, spray impregnating, precipitating on, hicoating, washcoating or spray drying,
wherein the catalyst support or catalyst after the pyrolytic removal of the binder has a BET specific surface area of from 0.01 to 250 m$^2$/g and a pore size distribution of from 50 to 300,000 nm measured by the mercury pressure porosimetry method.

3. A process for producing a polymodal catalyst support or catalyst as claimed in claim 2, wherein said organic powder has a polymodal particle size distribution or internal porosity.

4. A process for producing a monomodal or polymodal catalyst support or catalyst as claimed in claim 2, containing at least one or more members selected from the group of aluminium, iron, cobalt, nickel, palladium, platinum, copper, silver, molybdenum, zinc, titanium, zirconium, tungsten, niobium, chromium carbon, an inorganic powder selected from the group of $Al_2O_3$, MgO, $SiO_2$, $TiO_2$, $Y_2O_3$, $ZrO_2$, ZnO, $Fe_3O_4$, $Fe_2O_3$, CoO, $Co_2O_3$, $Cr_2O_3$, NiO, $B_2O_3$, $Ce_2O_3$, $CeO_2$, $Pr_2O_3$, $B_4C$, SiC, WC, TiC, TaC, $Si_3N_4$, AlN, BN, TiN and ZrN, and a mixture of two or more thereof.

5. A process for producing a monomodal or polymodal catalyst support or catalyst as claimed in claim 2, containing at least one or more members selected from the group of iron, cobalt, nickel, chromium, molybdenum and titanium, an inorganic powder selected from the group of SiC, $Si_3N_4$, BN, $B_4C$, WC, TiC, TiN, ZrN and AlN, and a mixture of two or more thereof.

6. A process for producing a monomodal or polymodal catalyst support or catalyst as claimed in claim 2, containing an inorganic powder selected from the group consisting of SiC, $Si_3N_4$ and a mixture thereof.

7. A process for producing a monomodal or polymodal catalyst support or catalyst as claimed in claim 2, comprising the step of shaping the mixture of A), B) and C) by a method selected from the group of granulation, pressing, rolling, extrusion, injection molding and continuous casting at from 80 to 250° C.

8. A process for producing a monomodal or polymodal catalyst support or catalyst as claimed in claim 2, wherein an acid selected from the group of nitric acid, oxalic acid dihydrate, anhydrous oxalic acid, acetic acid, formic acid, a mixture thereof and boron triffuoride is appllied for removing the binder.

9. A monomodal or polymodal catalyst support or catalyst obtained by the process according to claim 2.

10. A process for producing a monomodal or polymodal catalyst support or catalyst as claimed in claim 2, wherein said catalyst or catalyst support is a monolith or a bed of individual parts with a shape comprising Raschig rings, saddles, star rings, perforated and ribbed geometric bodies, wherein the said ribbed geometric bodies are rings, spheres, cuboids, cubes, cones, pyramids, prisms, octahedra, cylinders, truncatede pyramids, truncated cones, wagon wheel profiles, window frames profiles and mixtures thereof.

* * * * *